US012561351B2

(12) United States Patent
Addanki et al.

(10) Patent No.: US 12,561,351 B2
(45) Date of Patent: Feb. 24, 2026

(54) KNOWLEDGE BOT AS A SERVICE

(71) Applicant: PAYPAL, INC., San Jose, CA (US)

(72) Inventors: Santosh Addanki, Cupertino, CA (US);
Soujanya Lanka, Singapore (SG);
Nandana Murthy, San Jose, CA (US);
Koteswara Rao Pathuri, Georgetown,
TX (US); Bineet Ranjan, Bengaluru
(IN); Liang Xi, Elkhorn, NE (US);
Xiaoying Han, Santa Clara, CA (US);
Raghotham Sripadraj, Bengaluru (IN)

(73) Assignee: PAYPAL, INC., San Jose, CA (US)

( * ) Notice: Subject to any disclaimer, the term of this
patent is extended or adjusted under 35
U.S.C. 154(b) by 0 days.

(21) Appl. No.: 18/473,989

(22) Filed: Sep. 25, 2023

(65) Prior Publication Data

US 2025/0103622 A1      Mar. 27, 2025

(30) Foreign Application Priority Data

Aug. 4, 2023    (IN) .............................. 202341052669

(51) Int. Cl.
*G06F 16/30*        (2019.01)
*G06F 16/332*       (2019.01)
(Continued)

(52) U.S. Cl.
CPC ...... *G06F 16/3329* (2019.01); *G06F 16/3326*
(2019.01); *G06F 16/36* (2019.01)

(58) Field of Classification Search
CPC .......................... G06F 16/3326; G06F 16/3329
See application file for complete search history.

(56) References Cited

U.S. PATENT DOCUMENTS 11,431,660 B1    8/2022  Leeds et al.
11,544,475 B2    1/2023  Mittal et al.
             (Continued)

FOREIGN PATENT DOCUMENTS

WO      2011089450 A2    7/2011
WO      2015089336 A2    6/2015
             (Continued)

OTHER PUBLICATIONS

International Search Report and Written Opinion for Application
No. PCT/US2024/040226, mailed on Aug. 30, 2024, 9 pages.
             (Continued)

*Primary Examiner* — Khanh B Pham
(74) *Attorney, Agent, or Firm* — Haynes and Boone, LLP
(70481)

(57) ABSTRACT

Methods and systems are presented for providing a knowl-
edge bot configurable to interact with users across multiple
domains. The knowledge bot includes at least a text-based
search engine and a semantic-based search engine. Each of
the search engine is configured to retrieve documents from
a corpus of documents based on the user query. The user
query is in a natural language format. The retrieved docu-
ments may be ranked according to how relevant the docu-
ments are to the user query. A subset of the documents is
used as the search results based on the ranking. The search
results from the search engine are combined with the user
query to generate a prompt for an artificial intelligence
model. Based on the prompt, a response in the natural
language format is generated by the artificial intelligence
model.

20 Claims, 8 Drawing Sheets

(51) Int. Cl.
*G06F 16/3329*  (2025.01)
*G06F 16/36*  (2019.01)

(56) References Cited

U.S. PATENT DOCUMENTS

| 11,714,855 | B2 | 8/2023 | Mahindru et al. |
| 11,743,378 | B1 | 8/2023 | Johnston et al. |
| 11,875,240 | B1 | 1/2024 | Bosnjakovic |
| 11,960,514 | B1* | 4/2024 | Taylert ............... G06F 16/3329 |
| 2014/0278352 | A1 | 9/2014 | Clark |
| 2014/0279050 | A1 | 9/2014 | Makar |
| 2016/0070693 | A1* | 3/2016 | Carrier ............... G06F 16/3329 |
| | | | 707/755 |
| 2016/0371703 | A1 | 12/2016 | Monegan |
| 2017/0324867 | A1 | 11/2017 | Tamblyn |
| 2019/0206406 | A1 | 7/2019 | Sugiyama |
| 2019/0286712 | A1 | 9/2019 | Terry et al. |
| 2019/0311036 | A1 | 10/2019 | Shanmugam et al. |
| 2020/0117709 | A1 | 4/2020 | Galitsky |
| 2020/0137002 | A1 | 4/2020 | Chavda |
| 2020/0143115 | A1 | 5/2020 | Brigham et al. |
| 2020/0143247 | A1 | 5/2020 | Jonnalagadda et al. |
| 2020/0143265 | A1 | 5/2020 | Jonnalagadda et al. |
| 2020/0201913 | A1 | 6/2020 | Terry et al. |
| 2020/0374394 | A1 | 11/2020 | Karp |
| 2021/0374167 | A1 | 12/2021 | Williams et al. |
| 2022/0012600 | A1 | 1/2022 | Trim |
| 2022/0107792 | A1 | 4/2022 | Gottschlich |
| 2023/0121355 | A1* | 4/2023 | Srinivasan ....... G06V 30/19173 |
| | | | 707/759 |
| 2023/0245651 | A1 | 8/2023 | Wang |
| 2023/0274095 | A1 | 8/2023 | Kelkar et al. |
| 2024/0038226 | A1* | 2/2024 | Nouri ..................... G06F 40/35 |
| 2024/0095460 | A1* | 3/2024 | Xu .......................... G06F 40/30 |
| 2024/0144049 | A1 | 5/2024 | Cheng |
| 2024/0184991 | A1 | 6/2024 | Mahabaleshwarkar et al. |
| 2024/0256582 | A1* | 8/2024 | Jain ...................... G06F 16/338 |
| 2024/0330290 | A1* | 10/2024 | Shrestha ............. G06F 12/0246 |
| 2024/0419710 | A1* | 12/2024 | Matson ............... G06F 16/3329 |

FOREIGN PATENT DOCUMENTS

| WO | 2021108679 A1 | 6/2021 |
| WO | 2022043675 A2 | 3/2022 |

OTHER PUBLICATIONS

Cohen, "Right on Track: NVIDIA Open-Source Software Helps Developers Add Guardrails to AI Chatbots". [Retrieved from the Internet]. [Retrieved from https://blogs.nvidia.com/blog/2023/04/25/ai-chatbot-guardrails-nemo/ on Jan. 22, 2025.].

International Search Report and Written Opinion for Application No. PCT/US2024/40299, mailed on Oct. 18, 2024, 10 pages.

Bunt H., et al., "Semantic and Pragmatic Precision in Conversational AI Systems," Frontiers in Artificial Intelligence, Mar. 30, 2023, vol. 6, No. 896729, 16 pages.

Radziwill N., et al., "Evaluating Quality of Chatbots and Intelligent Conversational Agents," arXiv preprint arXiv: 1704.04579, 2017, 21 pages.

* cited by examiner

400

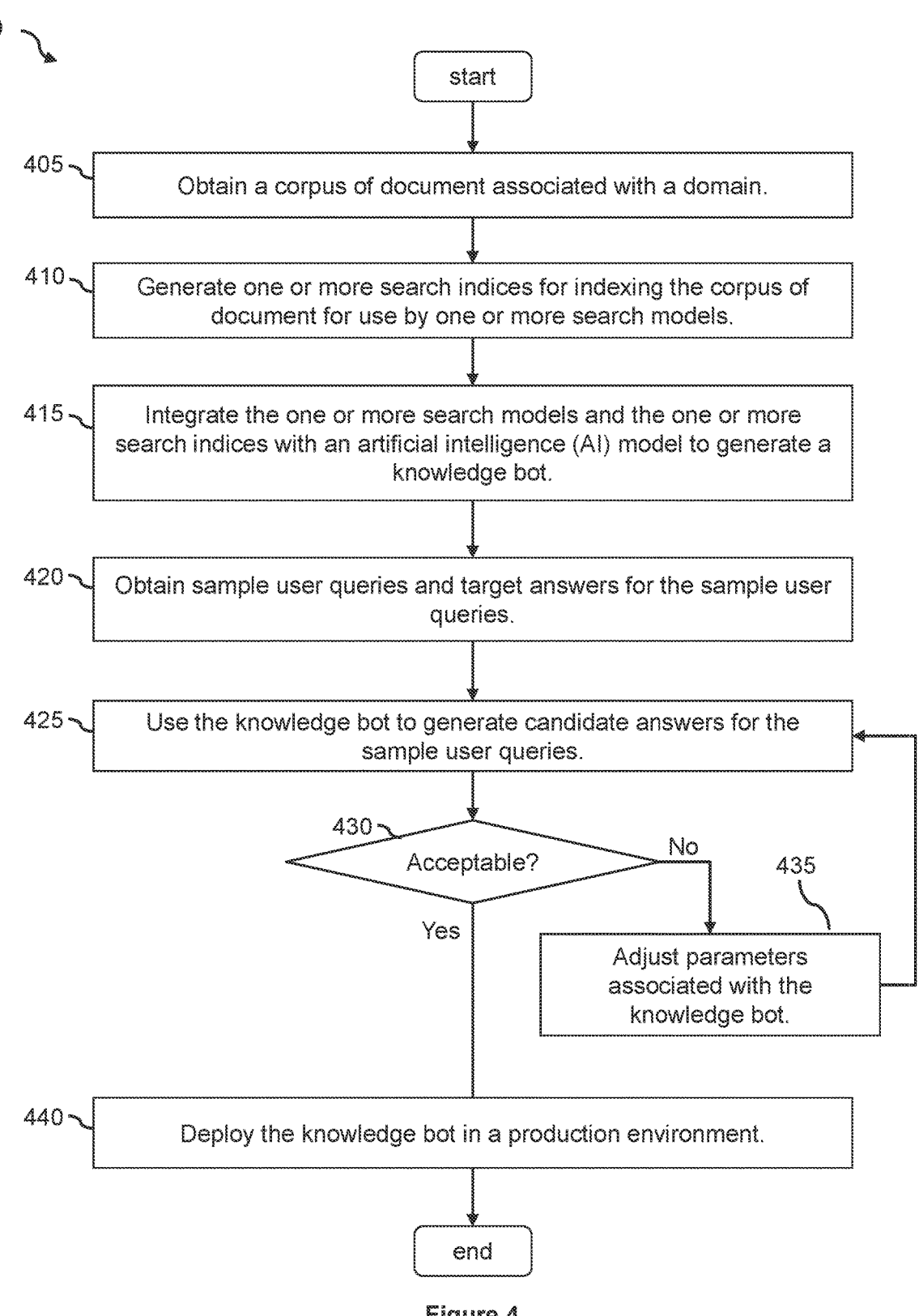

start

405 — Obtain a corpus of document associated with a domain.

410 — Generate one or more search indices for indexing the corpus of document for use by one or more search models.

415 — Integrate the one or more search models and the one or more search indices with an artificial intelligence (AI) model to generate a knowledge bot.

420 — Obtain sample user queries and target answers for the sample user queries.

425 — Use the knowledge bot to generate candidate answers for the sample user queries.

430 — Acceptable?

No

Yes

435

Adjust parameters associated with the knowledge bot.

440 — Deploy the knowledge bot in a production environment.

end

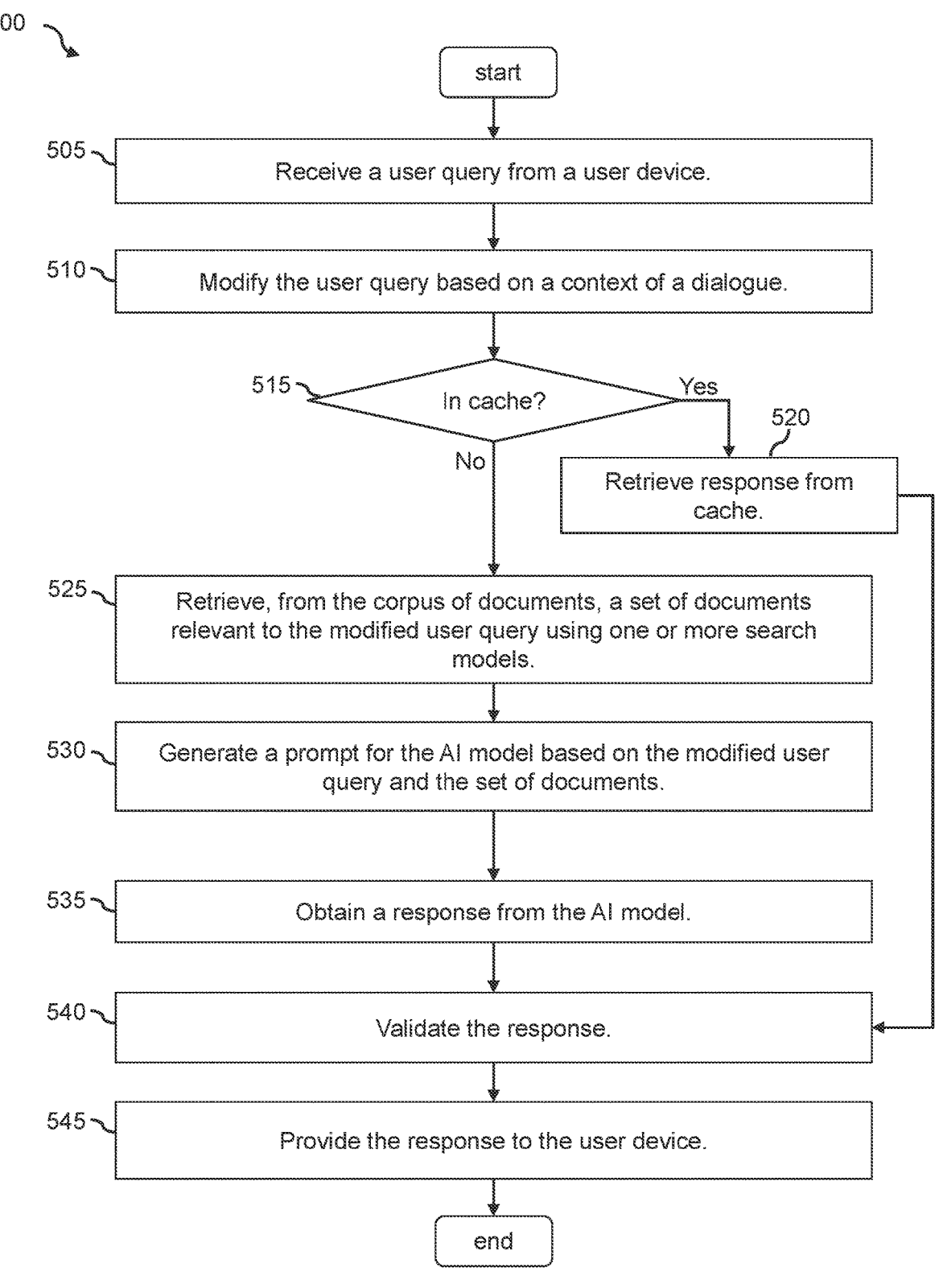

start

505 — Receive a user query from a user device.

510 — Modify the user query based on a context of a dialogue.

515 — In cache?    Yes

520

No

Retrieve response from cache.

525 — Retrieve, from the corpus of documents, a set of documents relevant to the modified user query using one or more search models.

530 — Generate a prompt for the AI model based on the modified user query and the set of documents.

535 — Obtain a response from the AI model.

540 — Validate the response.

545 — Provide the response to the user device.

end

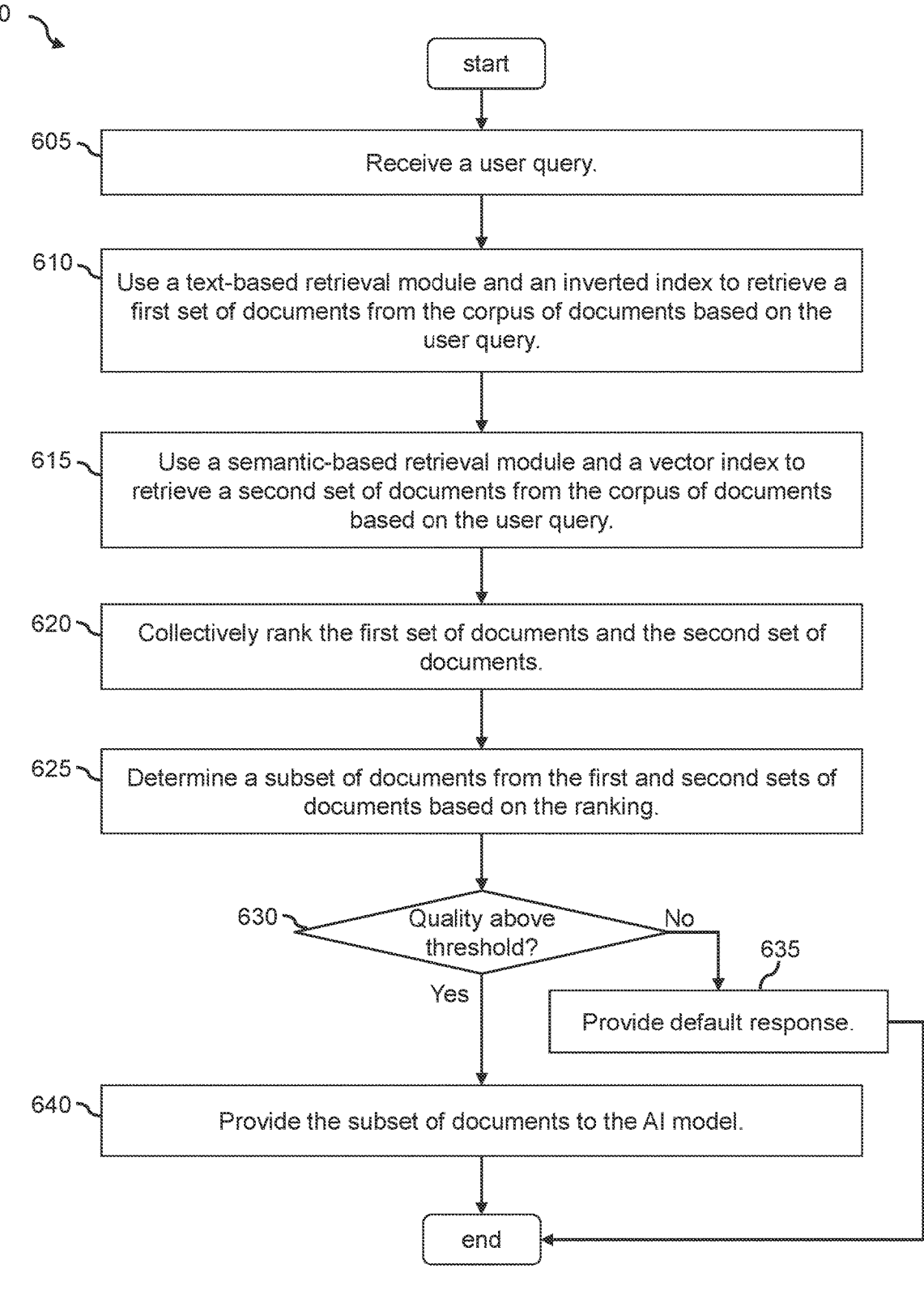

start

605 — Receive a user query.

610 — Use a text-based retrieval module and an inverted index to retrieve a first set of documents from the corpus of documents based on the user query.

615 — Use a semantic-based retrieval module and a vector index to retrieve a second set of documents from the corpus of documents based on the user query.

620 — Collectively rank the first set of documents and the second set of documents.

625 — Determine a subset of documents from the first and second sets of documents based on the ranking.

630 — Quality above threshold?

No

635

Provide default response.

Yes

640 — Provide the subset of documents to the AI model.

end

Figure 6

KNOWLEDGE BOT AS A SERVICE

BACKGROUND

The present specification generally relates to computer-based automated interactive services, and more specifically, to a framework for providing a knowledge bot configurable to interact with users across multiple domains according to various embodiments of the disclosure.

RELATED ART

Service providers typically provide a platform for interacting with their users. The platform can be implemented as a website, a mobile application, or a phone service, through which the users may access data and/or services offered by the service provider. While these platforms can be interactive in nature (e.g., the content of the platform can be changed based on different user interactions, etc.), they are fixed and bound by their structures. In other words, users have to navigate through the platform to obtain the desired data and/or services. When the data and/or the service desired by a user is "hidden" (e.g., requiring multiple navigation steps that are not intuitive, etc.), it may be difficult for the user to access the data and/or the service purely based on manual navigation of the platform.

In the past, service providers have often dedicated one or more information pages, such as a "Frequently Asked Questions (FAQ)" page, within the platforms for assisting users to access data and/or services that are popular in demand. The information pages may include predefined questions, such as "how to change my password" and pre-populated answers to the questions. However, given that the questions were pre-generated, a user who is looking for data and/or services is still required to navigate through the information pages to find a question that matches the data and/or services that the user desires. If the desired data and/or services do not match any of the questions on the information pages, the user will have to manually navigate the platform or contact a human agent of the service provider. Furthermore, the information pages also create an additional burden for the service provider, as the answers to the pre-generated questions would need to be reviewed and/or modified as necessary whenever any one of the platform, the data, and/or the services offered by the service provider is updated. Thus, there is a need for an advanced framework for providing data and/or services to users in a natural and intuitive way.

BRIEF DESCRIPTION OF THE FIGURES

FIG. 4 illustrates an example flow for generating a knowledge bot according to an embodiment of the present disclosure;

FIG. 5 illustrates an example flow for using a knowledge bot to generate a free-form answer according to an embodiment of the present disclosure;

FIG. 6 illustrates an example flow for using multiple search engines for generating search results according to an embodiment of the present disclosure;

Figure 1:
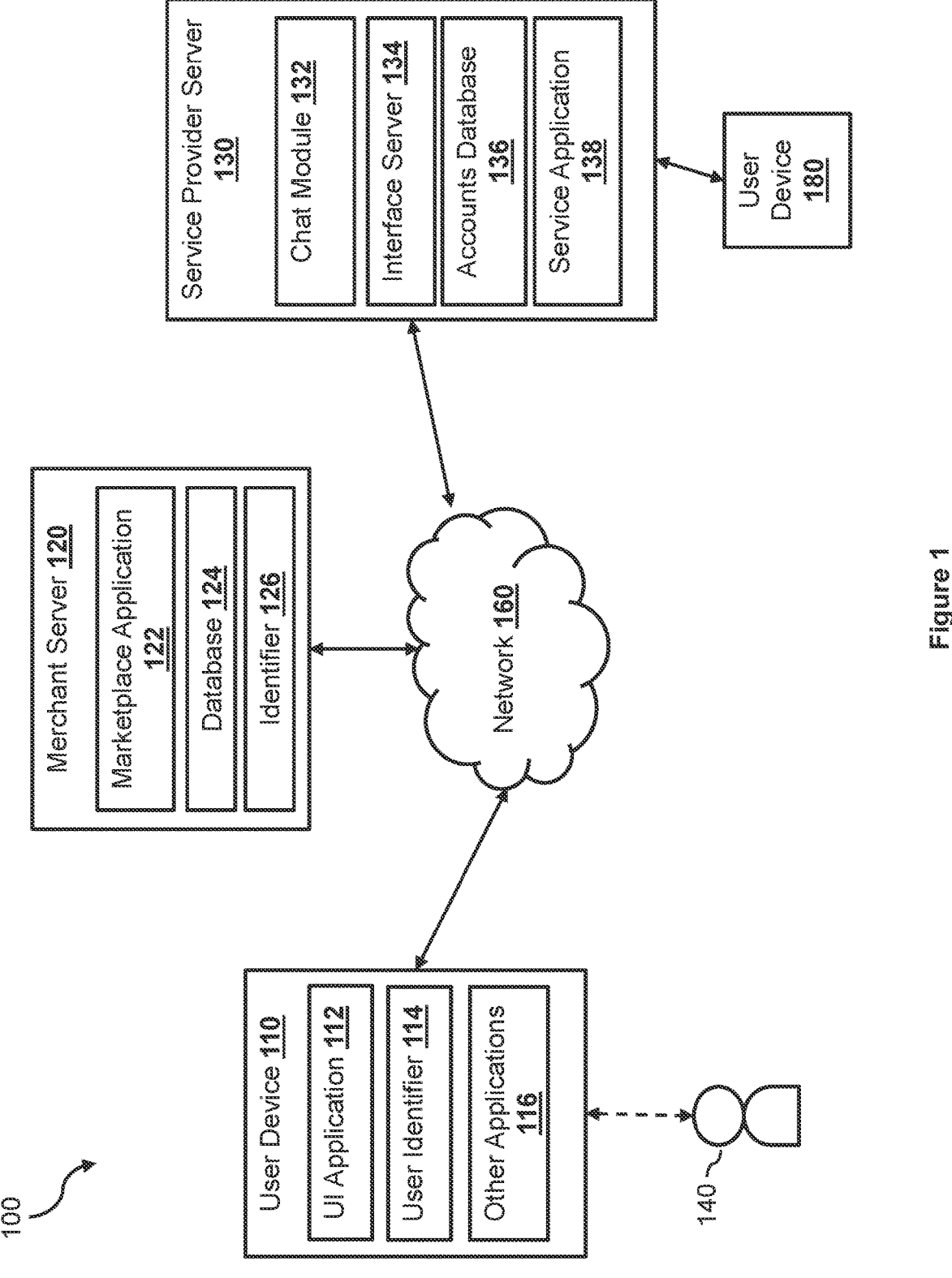
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing a knowledge bot configurable to interact with users across multiple domains. Similar to a chat bot, a knowledge bot is a software module that is capable of interacting with users through dialogues in natural languages (e.g., free-form/unstructured texts). However, unlike a chat bot that typically uses pre-defined rules and structured texts for interacting with the users, a knowledge bot configured using the techniques disclosed herein can dynamically search for relevant documents within one or more specific domains based on a user query, and generate a free-form response to the user query using content extracted from the relevant documents.

In some embodiments, knowledge bots may be dynamically generated (e.g., as a service) for different service providers or for different domains within a service provider. Each service provider, or each domain within a service provider, may be associated with documents that include information and knowledge related to the service provider or the domain. For example, a service provider may have access to product manuals associated with products and/or services offered by the service provider, technical articles and/or marketing articles published by the engineers or marketing teams of the service provider, press releases generated by the service provider, reviews and other articles that are generated by third parties describing the products and/or services offered by the service provider, etc. The documents related to a service provider may be associated with different domains. For example, the documents related to the service provider may include documents associated with navigating the platform of the service provider, documents associated with products and/or services offered by the service provider, documents associated with legal matters such as user data privacy protection, and documents associated with other domains.

In order to generate a knowledge bot for a particular service provider, a chat system may first obtain the documents related to one or more domains associated with the particular service provider. When the documents are associated with different domains, the chat system may divide the documents into different sets of documents (also referred to as different "corpuses of documents") based on the corresponding domains, such that each domain may be associated with a corresponding corpus of documents. The chat system may then generate one or more indices for each corpus of the documents that can be used by one or more search engines for searching the corpus of documents based on user queries. In some embodiments, the chat system may generate multiple indices, such as an inverted index and a vector index, for each corpus of documents.

An inverted index is an index data structure that stores mappings from content, such as words or character strings, extracted from documents to locations of the documents within the corpus of documents. In some embodiments, the mappings can be implemented as a hash table that uses different words or character strings extracted from each document of the corpus of documents as keys. The keys are mapped to values indicating locations of documents that include the corresponding words or character strings. The inverted index can be used by a text-based search engine to perform a search to retrieve relevant documents based on a query. For example, upon receiving a user query, the text-based search engine may identify keys within the hash table that includes keywords that match words or character strings included in the user query, and may retrieve documents that are mapped from the keys.

A vector index is another type of index data structure. Unlike the inverted index that uses words or character strings for the indices, the vector index is built on vectors through one or more mathematical models. To generate the vector index, the chat system may extract embeddings from the corpus of documents (e.g., by using one or more natural language models, such as a bidirectional encoder representations from transformers (BERT) model, etc.). In some embodiments, the chat system may generate the embeddings by parsing the words in the documents in multiple directions (e.g., forward and backward, etc.), such that the chat system may understand the meaning of each word not just based on the word itself, but also the neighboring words (e.g., words the come before and after the word). The embeddings generated for a document may represent contextual meanings of the document.

Each embedding can be implemented as a vector having a set of dimensions, where each dimension may correspond to a specific meaning/context. As such, each embedding may encompass a semantic context derived from a portion of a document (e.g., a phrase, a sentence, a paragraph, etc.). In other words, each embedding captures a context (instead of keywords) of the corresponding portion of the document. Similar to the inverted index, the embeddings may be implemented as keys in a table (e.g., a hash table) that are mapped to the corresponding documents. A semantic-based search engine may then use the vector index to perform a search to retrieve relevant documents based on a query. For example, upon receiving a user query, the semantic-based search engine may extract one or more embeddings based on the user query. The semantic-based search engine may then identify keys (which include embeddings) that match the one or more embeddings. For example, a key matches an embedding from the one or more embeddings when a Euclidean distance between the key (which corresponds to an embedding) and the embedding from the one or more embeddings is within a threshold. The semantic-based search engine may retrieve documents corresponding to the matched keys.

One advantage of using a vector index to query the corpus of documents is that documents that share similar semantic contexts with the user query (but may not include identical keywords within the documents) will be retrieved by the semantic-based search engine. Since the documents do not include identical keywords as the user query, the text-based search engine may not be capable of retrieving such relevant documents. On the other hand, since the embeddings stored in the vector index are constrained by the number of dimensions, and may not be able to represent every keyword in the documents, the semantic-based search engine may miss certain relevant documents that the text-based search engine can retrieve based on a user query. As such, the chat system may use both the inverted index and the vector index for retrieving relevant documents for a query in order to enhance the search result.

Once the indices are generated based on the corpus (or corpuses) of documents, the chat system may integrate the search engines (e.g., the text-based search engine, the semantic-based search engine, etc.) with a machine learning model (e.g., a generative artificial intelligence model (also referred to as a large language model) such as ChatGPT by OpenAIR, Bard, DALL-E, Midjourney, DeepMind, etc.) for the knowledge bot. In some embodiments, the chat system may integrate a data framework (e.g., LlamaIndex, LangChain, etc.) for ingesting and structuring data associated with different domains for the machine learning model. The framework provides data connectors that enable the knowledge bot to ingest data of different formats (e.g., PDFs, text documents, etc.) from various data sources using different Application Programming Interfaces (APIs).

In some embodiments, the chat system may also provide an interface for interacting with the users and enabling the users to access and utilize the knowledge bot. In some embodiments, the interface may be implemented as a chat window that may be integrated within the platform of the service provider, such that the users may interact with the knowledge bot by providing queries in a text format. In some embodiments, the interface maybe implemented within an interactive voice response (IVR) system such that the users may interact with the knowledge bot by providing queries in a voice format. The chat system may then translate the voice query into a text query using one or more voice recognition algorithms.

When the knowledge bot is configured to process queries across multiple domains, the knowledge bot may first analyze the user query received from the user to determine which domain the user query is associated with. The user query received from the user may be unstructured and free form (that is, does not conform to a predefined structure or form specified by the service provider). The knowledge bot may then identify the indices and the corpus of documents corresponding to the domain associated with the user query, and may use the search engines (e.g., the text-based search engine, the semantic-based search engine, etc.) to retrieve documents, from the corpus of documents, that are relevant to the user query. For example, the text-based search engine may extract keywords (e.g., words or strings of characters, etc.) from the user query, and match the keywords with one or more associated keys in the inverted index. The text-based search engine may identify a first set of documents that are mapped from the one or more associated keys as relevant to the user query.

Similarly, the semantic-based search engine may also retrieve a second set of documents, from the corpus of documents, that are relevant to the user query. For example, the semantic-based search engine may determine one or more embeddings (e.g., vectors) based on the user query. The semantic-based search engine may then compare the one or more embeddings to the embeddings stored in the vector index, and may identify a set of embeddings stored in the vector index that are most similar to the one or more embeddings (e.g., having Euclidean distances from the one or more embeddings within a threshold, etc.). The semantic-based search engine may retrieve, from the corpus of documents, the second set of documents mapped from the set of embeddings.

As discussed herein, each of the search engines has its strengths and weaknesses, and may retrieve relevant documents that the other search engine may miss. As such, the first set of documents retrieved by the text-based search engine and the second set of documents retrieved by the semantic-based search engine may not completely overlap, as the text-based search engine may retrieve one or more documents that are missed by the semantic-based search engine, and the semantic-based search engine may similarly retrieve one or more documents that are missed by the text-based search engine. In order to optimize the quality of the search results, which will then be provided to the machine learning model for generating a response, the knowledge bot may merge the two sets of documents retrieved by the text-based search engine and the semantic-based search engine, respectively. In some embodiments, as each of the search engines retrieves the relevant documents, each search engine may determine a relevancy score (or confidence score) for each of the retrieved documents. The score may indicate how confident the search engine is that the document is related to the user query. For example, the text-based search engine may determine a higher score for a document that includes all of the keywords extracted from the user query than a document that includes only one keyword extracted from the user query. Similarly, the semantic-based search engine may determine a higher score for a document associated with embeddings that are closer to the embeddings associated with the user query than a document associated with embeddings that are farther away from the embeddings associated with the user query.

In some embodiments, the knowledge bot may rank the documents within the first and second sets of documents based on the scores, and may generate a set of relevant documents (e.g., selecting the highest ranked number of documents, etc.). The knowledge bot may then generate an input (e.g., a prompt) for the machine learning model based on the user query and the set of relevant documents. Based on the prompt, the machine learning model may generate a response to the user query based on the content of the set of relevant documents. For example, the machine learning model may also generate embeddings based on the set of relevant documents. The machine learning model may then match the embeddings generated based on the user query with embeddings generated based on the set of relevant documents, and may extract portions of the content from the set of relevant documents for use in generating the response to the user query. The machine learning model may generate the response in a natural language format (e.g., a free-form, unstructured format) based on the extracted portions of the content according to one or more parameters. As such, the response may include one or more sentences and/or one or more paragraphs.

In some embodiments, the knowledge bot may use multiple machine learning models for generating responses to different user queries. For example, the chat system may configure the knowledge bot to use a simpler machine learning model (e.g., a machine learning model having simpler internal structures) for generating responses for user queries that are less complex. The responses generated by such a machine learning model may be directly copied from one or more of the relevant documents. On the other hand, the knowledge bot may use a more sophisticated machine learning model (e.g., a machine learning model having more complex internal structures) for generating responses for user queries that are more complex. The responses generated by such a machine learning model may include new content that is not found in any of the relevant documents. Rather, the new content in some embodiments may be derived or otherwise generated by the machine learning model through the internal structure of the machine learning model based on the relevant documents. After generating the response, the knowledge bot may provide the response on the interface (e.g., display the response on a chat window of a user device, transmit an audio response to a user device, etc.).

In some embodiments, the knowledge bot may continue to interact with the user. For example, the user may continue to have a natural, free-form dialogue with the knowledge bot via the interface. In one example, the user may provide a subsequent query to the knowledge bot, and the knowledge bot may again process the subsequent query using the techniques disclosed herein, and provide the user with another response. Since the user may submit multiple queries within an online session (e.g., a session being defined as an uninterrupted connection between the user device of the user and the knowledge bot over a network), some of the queries may be related to each other. In some scenarios, the background (or the context) of the session may help the knowledge bot in interpreting a user query more accurately.

Consider an example in which the user submits a first query "how do I generate a document using XYZ program?" to the knowledge bot. The knowledge bot may retrieve the relevant documents from a corpus of documents associated with the XYZ program product, and may generate a first response to the user. The first response may indicate how the user can generate a document using the XYZ program. After creating a document using the XYZ program, the user may submit a second query "I don't know how to save it" to the knowledge bot. Based solely on the second query, the knowledge bot may not be able to understand the question, or would retrieve documents that may not be relevant to the query or may not be useful in helping the user based on the query. However, based on the context from the conversation between the user and the knowledge bot within the same online session (e.g., including the first query and the first response or other previous queries and/or responses, etc.), the knowledge bot may understand that the user would like to know how to save a document generated in the XYZ program. In some embodiments, the context of a subsequent user query need not be during the same online session, but could be during a later online session. In this case, the knowledge bot would be able to access queries and responses from previous online sessions for the user to provide additional context to a current query. Online sessions conducted within a shorter time frame (e.g., within an hour of the current online session) may be more relevant, and as such, the knowledge bot need not look at all previous online sessions, but only more recent ones, such as within the same day (or other time frame) as the current online session.

As such, in some embodiments, the knowledge bot may modify a user query based on a context of the online session (or any previous online sessions), and may use the modified user query to generate the response in order to improve the quality of the responses and the dialogue with the user. For example, the knowledge bot may include a chat history data storage and may store user queries submitted by the user and responses generated for the user queries in the chat history data storage. When the knowledge bot receives a new query from the user (e.g., the second user query), the knowledge bot may generate a context based on the chat history between the user and the knowledge bot (the chat history may encompass only the user queries and responses associated with the same online session or user queries and responses associated with this online session and any previous online sessions, etc.). The knowledge bot may modify the second user query based on the context.

Using the example illustrated above, since the user was inquiring about generating a document using the XYZ program in the first query, the knowledge bot may infer that the term "it" in the second query refers to "the document in the XYZ program" based on the context derived from the online session. The knowledge bot may then modify the second query by substituting the word "it" with the phrase "the document in the XYZ program." The modified second query may become "I don't know how to save the document in the XYZ program."

The knowledge bot may then use the search engines to retrieve relevant documents for the user based on the modified second query. The knowledge bot may also use the modified second query and the retrieved documents to generate a prompt for the machine learning model. Based on the prompt, the machine learning model may generate a second response to the second user query. The knowledge bot may provide the second response to the user via the interface. After providing the second response to the user, the knowledge bot may also store the modified second query and the second response in the chat history data storage for processing subsequent queries from the user.

One of the drawbacks of the knowledge bot is that it requires substantial computation resources for performing the document retrieval process (based on the use of semantic search) and the response generation process. As such, in some embodiments, to further enhance the performance of the knowledge bot, the chat system may incorporate a semantic cache layer within the knowledge bot, such that the same response that is stored in a cache memory can be used to respond to similar user queries. The semantic cache layer is different from a conventional cache system where an exact match is required between a user query and a key of the cache in order to use the cache data for a response. Using a conventional cache system, a new query has to be identical to a key stored in a cache memory for the cache system to use the response from the matched key for the new query. As such, since a query "I want to add card" is not an exact match with stored key corresponding to a query "I want to add credit card," the query "I want to add card" will not trigger a retrieval of the response from the cache memory, even though the response to the query "I want to add card" should be the same as the response to the query "I want to add credit card."

On the other hand, the semantic cache layer does not store queries directly as keys in the cache memory. Instead, the semantic cache layer is configured to store embeddings associated with different user queries submitted to the knowledge bot in the past. In some embodiments, due to the limited storage capacity of the semantic cache layer, the semantic cache layer may select embeddings associated with a number of most frequently submitted queries to store in the cache memory. Each of the embeddings may be linked to a response that has been generated by the machine learning model in the past and provided to a user.

When a new user query is received (e.g., via the interface), the knowledge bot may check to see if a match exists within the semantic cache layer before using the search engines and the machine learning model to generate a response for the new user query. The knowledge bot may use the machine learning model to generate one or more embeddings based on the user query. The knowledge bot may then determine if any keys (embeddings) within the cache memory that are similar to the one or more embeddings generated based on the user query. Unlike the conventional cache system where an exact match to the key is required, the knowledge both may identify a match if a key within the cache memory is within a threshold distance from the one or more embeddings generated based on the user query. If a key is matched with the embeddings generated based on the user query, the sematic cache layer May provide the response that is linked to the matched key (the response that was previously generated by the knowledge bot as a response to a previous query) to the interface as a response to the new user query.

In some embodiments, after generating the knowledge bot, the chat system may validate the knowledge bot and the responses generated by the knowledge bot. The chat system may validate the knowledge bot in an online manner and an offline manner. For example, the chat system may use a set of test queries for validating the knowledge bot in an offline manner. The set of test queries may include queries of different lengths, where a portion of the set of test queries is below a length threshold and another portion of the set of test queries is above the length threshold. The queries may have been provided to different chat bots to generate benchmark responses, and the benchmark responses may have been further reviewed and revised by one or more human agents. As such, a set of benchmark responses corresponding to the set of test queries may be obtained by the chat system. The chat system may generate embeddings based on each of the set of benchmark responses.

By providing the set of test queries to the knowledge bot, the chat system may obtain a set of test responses from the knowledge bot. The chat system may also generate embeddings based on each of the set of test responses from the knowledge bot. For each of the set of test queries, the chat system may compare the embeddings generated based on the corresponding benchmark response against the embeddings generated based on the corresponding test response. The chat system may determine a deviation between the two embeddings. If the deviations for the set of test queries (e.g., the chat system may use a total deviation, an average deviation, a mean deviation, etc.) are greater than a threshold, the chat system may reconfigure the knowledge bot, for example, by adjusting one or more parameters associated with the search engines and/or adjusting one or more parameters associated with the machine learning model. The chat system may test various versions of the knowledge bot (each version may be associated with different parameters for the search engines and/or different parameters for the machine learning model), and may select the version of the knowledge bot having the least deviations.

In some embodiments, the chat system may determine, based on the deviations between the embeddings, that the corpus of document lacks information associated with a particular topic within the domain. For example, the chat system may determine that the deviations are substantially larger for a subset of queries related to the particular topic than other queries. The chat system may retrieve (e.g., crawl within an internal network of the service provider or on the Internet) additional documents related to the particular topic, and may add the additional documents to the corpus of documents for use by the knowledge bot.

In some embodiments, during live operation of the knowledge bot, the chat system may intercept a response generated by the machine learning model for a user query before the response is provided to a user via an interface. The chat system may validate the response, and may modify the response before providing the modified response to the user. For example, the chat system may adapt a guideline of the service provider in validating/correcting responses, such as removing one or more words that are determined to be inappropriate. In some embodiments, when the response generated by the machine learning model is deemed to be inappropriate overall, the chat system may not provide the response to the user, and may instead provide a default response (e.g., "we cannot find an answer to your question," etc.) to the user.

In some embodiments, the chat system may also intercept a user query submitted by a user before providing the user query to the knowledge bot. The chat system may determine whether the user query is appropriate or related to one of the known domains associated with the service provider. For example, a user query of "how is the weather today" or "who is the president" may not be associated with any domains associated with the service provider. The chat system may provide the default response to the user without providing such a query to the knowledge bot, which improves the efficiency of the system by requiring less computational resources.

There are many technical advantages in generating knowledge bots using the techniques disclosed herein. For example, since a single knowledge bot can be linked to different knowledge bases (e.g., different indices corresponding to different corpus of documents associated with different domains, etc.), the knowledge bot can be dynamic and flexible in answering user questions associated with different domains without requiring the generation of multiple knowledge bots that cater to the different domains or reconfiguring and/or retraining of the knowledge bot. Furthermore, by configuring the knowledge bot to use different sets of parameters for the search engines to retrieve documents and different sets of parameters for the machine learning model to generate responses, the knowledge bot can be configured to generate responses in different manners (e.g., different length requirements, different tone requirements, different complexity requirements, etc.) for different domains. For example, the knowledge bot may configure the machine learning model to generate responses with less technical complexity, longer in length, and in a professional tone when the user query is associated with a domain related to customers of the service provider. On the other hand, the knowledge bot may configure the machine learning model to generate responses with more technical complexity and shorter in length when the user query is associated with a domain related to technical staffs of the service provider.

In addition, since the knowledge bot is generated by integrating different modules (e.g., different search engines, a machine learning model, etc.) that can perform their corresponding functionalities independent of each other, these modules can be easily interchangeable. For example, the chat system may replace one machine learning model (e.g., a ChatGPT) with another machine learning model (e.g., Bard), or replace one search engine with another search engine in a plug-and-play manner, and the knowledge bot can continue to function the same way without interruptions.

FIG. 1 illustrates an electronic transaction system 100, within which the chat system may be implemented according to one embodiment of the disclosure. The electronic transaction system 100 includes a service provider server 130, a merchant server 120, and user devices 110 and 180 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online purchase transaction with the merchant server 120 via websites hosted by, or mobile applications associated with, the merchant server 120. The user 140 may also log in to a user account to access account services or conduct electronic transactions (e.g., data access, account transfers or payments, etc.) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160. Thus, the user 140 may use the user interface application 112 to initiate electronic transactions with the merchant server 120 and/or the service provider server 130.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile).

In various implementations, the user 140 is able to input data and information into an input component (e.g., a keyboard) of the user device 110. For example, the user 140 may use the input component to interact with the UI application 112 (e.g., to conduct a purchase transaction with the merchant server 120 and/or the service provider server 130, to initiate a chargeback transaction request, etc.).

The user device 180 may include substantially the same hardware and/or software components as the user device 110, which may be used by a user who is internal to a service provider associated with the service provider server 130 to initiate building and configuring of one or more knowledge bots to the service provider or other service providers (e.g., such as the merchant associated with the merchant server 120, etc.). Alternatively, the user device 180 may also be used by a user internal to the service provider to interact with one or more knowledge bots associated with the service provider server 130.

The merchant server 120, in various embodiments, may be maintained by a business entity (or in some cases, by a partner of a business entity that processes transactions on behalf of business entity). Examples of business entities include merchants, resource information providers, utility providers, online retailers, real estate management providers, social networking platforms, a cryptocurrency brokerage platform, etc., which offer various items for purchase and process payments for the purchases. The merchant server 120 may include a merchant database 124 for identifying available items or services, which may be made available to the user devices 110 and 180 for viewing and purchase by the respective users.

The merchant server 120, in one embodiment, may include a marketplace application 122, which may be configured to provide information over the network 160 to the user interface application 112 of the user device 110. In one embodiment, the marketplace application 122 may include a web server that hosts a merchant website for the merchant. For example, the user 140 of the user device 110 (or the user of the user device 180) may interact with the marketplace application 122 through the user interface application 112 over the network 160 to search and view various items or services available for purchase in the merchant database 124. The merchant server 120, in one embodiment, may include at least one merchant identifier 126, which may be included as part of the one or more items or services made available for purchase so that, e.g., particular items and/or transactions are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user device 110 and the service provider server 130 via the network 160.

The service provider server 130, in one embodiment, may be maintained by a transaction processing entity or an online service provider, which may provide processing of electronic transactions between users (e.g., the user 140 and users of other user devices, etc.) and/or between users and one or more merchants. As such, the service provider server 130 may include a service application 138, which may be adapted to interact with the user device 110 and/or the merchant server 120 over the network 160 to facilitate the electronic transactions (e.g., electronic payment transactions, data access transactions, etc.) among users and merchants processed by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities (e.g., between two users, between two merchants, etc.). In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user devices 110 and 180 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user (e.g., the user 140, the user of the user device 180, or a merchant associated with the merchant server 120, etc.) may access a user account associated with the user and access various services offered by the service provider server 130, by generating HTTP requests directed at the service provider server 130.

The service provider server 130, in one embodiment, may be configured to maintain one or more user accounts and merchant accounts in an accounts database 136, each of which may be associated with a profile and may include account information associated with one or more individual users (e.g., the user 140 associated with user device 110, etc.) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 also includes a chat module 132 that implements the chat system as discussed herein. In some embodiments, the chat module 132 may provide a user interface that enables users (e.g., internal users of the service provider server 130 such as the user of the user device 180, etc.) to submit requests and parameters for generating and configuring knowledge bots. For example, the user of the user device 180 may specify a particular service provider (e.g., the service provider associated with the service provider server 130 or other service providers, such as the merchant associated with the merchant server 120, etc.) and one or more domains associated with the service provider. In specifying the one or more domains, the user may provide the locations of the documents that are associated with the one or more domains.

Based on the user inputs, the chat module 132 may generate and configure one or more knowledge bots using the techniques disclosed herein for serving users of the service provider server 130 (or other service providers, such as the merchant associated with the merchant server 120). For example, the chat module 132 may generate one or more knowledge bots for the one or more domains associated with the service provider server 130 specified in the user inputs (e.g., a products and services information domain, an internal knowledge bank domain, a platform usage domain, etc.). The chat module 132 may then configure the one or more knowledge bots to provide dialogue interactions with users based on different corpuses of documents associated with the different domains.

Figure 2:
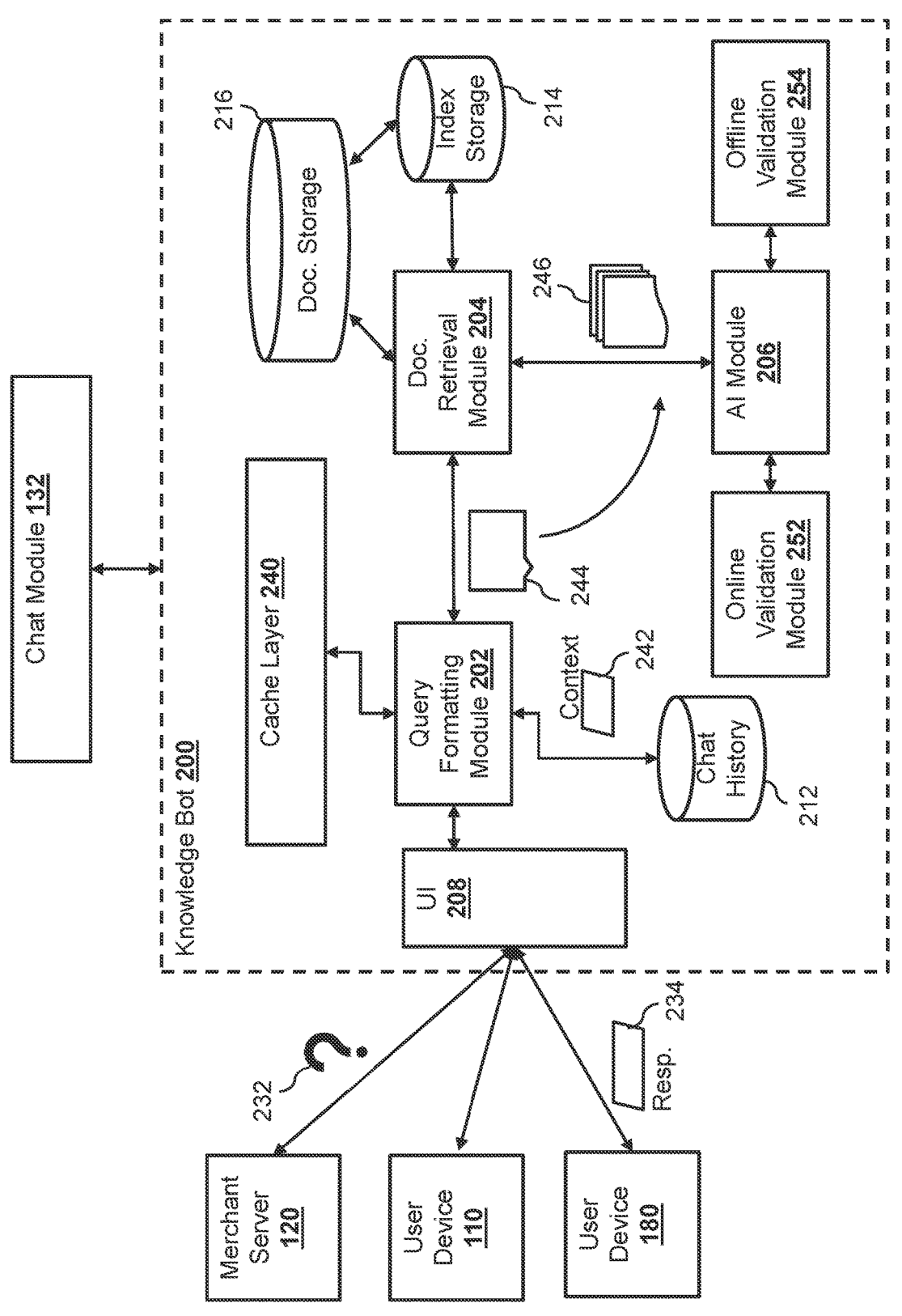
FIG. 2 is a block diagram illustrating a knowledge bot according to an embodiment of the present disclosure.

FIG. 2 illustrates an example knowledge bot generated by the chat module 132 according to various embodiments of the disclosure. As discussed herein, the chat module 132 may be configured to provide the knowledge bot as a service for different service providers and/or different domains within a service provider. Specifically, the chat module 132 may generate and configure one or more knowledge bots, such as a knowledge bot 200, for different service providers and/or different domains.

Upon receiving a request for generating a knowledge bot for one or more domains, the chat module 132 of some embodiments may obtain documents related to the one or more domains. The documents may include product manuals associated with products and/or services offered by the service provider, technical articles and/or marketing articles published by the engineers or marketing teams of the service provider, press releases generated by the service provider, reviews and other articles that are generated by third parties describing the products and/or services offered by the service provider, internal process documentations associated with the service provider, etc. The chat module 132 may store the documents in a document storage 216 (or multiple storages accessible by the chat module 132). In some embodiments, when the documents obtained by the chat module 132 are associated with multiple domains, the chat module 132 may divide the documents into groups such that all documents associated with the same domain are stored in the same group. Each group of documents may form a corpus of documents to be used by the knowledge bot 200 to generate responses to various user queries.

The chat module 132 may then generate one or more indices for each corpus of documents stored in the document storage 216. The one or more indices may be used by one or more corresponding search engines for retrieving documents, from a corpus of documents stored in the document storage 216, that are relevant to a user query. In some embodiments, the chat module 132 may generate an inverted index and a vector index for each corpus of documents stored in the document storage 216, and may store the inverted index and the vector index in an index storage 214.

An inverted index is an index data structure that stores mappings from content, such as words or character strings, extracted from documents to locations of the documents within the corpus of documents. To generate the inverted index, the chat module 132 may parse through the documents in each corpus of documents, and may extract keywords (e.g., words or strings of characters that appear in each document, etc.) from each document. The chat module 132 may store the keywords as keys in a hash table, which are then linked to locations of the documents that include the corresponding keywords in the document storage 216. The inverted index can be used by a text-based search engine to perform a search to retrieve relevant documents based on a query.

A vector index is another type of index data structure. Unlike the inverted index that uses words or character strings for the indices, the vector index is built on vectors through one or more mathematical models. To generate the vector index, the chat module 132 may extract embeddings from the documents in each corpus of documents (e.g., by using one or more natural language models, such as a BERT model, etc.). In some embodiments, the chat module 132 may generate the embeddings by parsing the words in each document in multiple directions (e.g., forward and backward, etc.), such that the chat module 132 (and/or the natural language model) may understand the meaning of each word not just based on the word itself, but also the neighboring words (e.g., words the come before and after the word). The embeddings generated for a document may represent contextual meanings of the document.

In some embodiments, the chat module 132 may implement an embedding as a vector within a multi-dimensional space, which may represent a semantic context that is derived from a portion of a document (e.g., by understanding the meaning of one or more words in the document based on the neighboring words). The chat module 132 may store the embeddings as keys in a hash table that are linked to locations of the documents from which the embeddings are derived. A semantic-based search engine may then use the vector index to perform a search to retrieve relevant documents based on a query.

The chat module 132 may then integrate a user interface module 208, a query formatting module 202, a document retrieval module 204, and an AI module 206 within the knowledge bot 200. In some embodiments, the user interface module 208 may provide an interface for users to interact with the knowledge bot 200. The interface may be implemented as a chat interface that enables a user, via a user device, to provide text input in the natural language format (e.g., a user query), and to view responses to the user queries generated by the knowledge bot 200. In some embodiments, the interface may be implemented as an interactive voice response (IVR) system, which enables the users to have a voice dialogue with the knowledge bot 200.

The user interface 208 may provide the interface on any device, such as the user device 110, the user device 180, and/or the merchant server 120. A user, via the interface provided on a device, may submit a user query 232 to the knowledge bot 200. The query may be a question in natural language format, such as "how do I reset my password," "how do I generate a document using your XYZ program," "I want to add a credit card to my account," etc. Since the user can submit any free-form questions, the user can provide the query in any desirable manner, not limited by a pre-existing structure. Upon receiving the user query 232, the query formatting module 202 of the knowledge bot 200 may re-format the user query 232. For example, the query formatting module 202 may modify the user query 232 based on a context associated with a dialogue between the user and the knowledge bot 200 during a current chat session (and/or previous chat sessions). It has been contemplated that as the user is having a dialogue with the knowledge bot 200, the user may submit user queries using languages that refer to previous queries or statements during the chat session (or previous chat sessions). As such, the knowledge bot 200 may be configured to store any previously submitted user queries from the user and responses generated for the user queries in a chat history data storage 212. When the query formatting module 202 receives the user query 232, the query formatting module 202 may derive a context 242 based on the user queries previously submitted by the user and responses generated for the user during the current chat session. In some embodiments, the query formatting module 202 may also include queries and responses from previous chat sessions between the user and the knowledge bot 200 for generating the context. However, since the current chat session is more relevant and indicative to the meaning of the user query 232, the query formatting module 202 may either use only the queries and responses from the current chat session or assign a larger weight to the queries and responses from the current chat session than the queries and responses from the previous chat sessions.

For example, during the chat session between the user and the knowledge bot 200, the user may initially ask the knowledge bot 200 "how do I generate a document in your XYZ program." After obtaining a response generated by the knowledge bot 200, the user may subsequently ask "how do I save it" (which is the user query 232) via the user interface 208. The knowledge bot 200 may not be able to accurately interpret the user query 232, and thus may fail to generate a relevant response for the user query 232 based on the query alone, since the user query is missing critical information (e.g., what does "it" refer to, etc.). However, given the context derived from at least the previous user query "how do I generate a document in your XYZ program," the query formatting module 202 may derive a context for the chat session (e.g., that the chat session is related to document and XYZ program). The query formatting module 202 may then modify the user query 232 to generate a modified query 244 based on the context. In some embodiments, the query formatting module 202 may add words, remove words, or replace words in the user query when modifying the user query. In this example, the query formatting module 202 may substitute the word "it" in the user query 232 with "a document using XYZ program" based on the context. The modification of the user queries based on context may improve the searching of relevant documents to the user query (by the document retrieval module 204) and the generation of relevant and helpful responses to the user query (by the AI module 206).

The query formatting module 202 may then pass the modified query 244 to the document retrieval module 204 for retrieving documents that are relevant to the user query 232. In some embodiments, when the knowledge bot 200 is configured to process queries across multiple domains, the document retrieval module 204 may first determine a domain, from the one or more domains) associated with the modified query 244. For example, the document retrieval module 204 may parse the modified query 244, and determine a particular domain, from the one or more domains, based on the words included in the modified query 244. The document retrieval module 204 may then access the one or more indices generated by the chat module 132 for the particular domain from the index storage 214.

In some embodiments, the document retrieval module 204 may include one or more search engines that may match the modified query 244 to one or more keys in the indices stored in the index storage 214. The document retrieval module 204 may also retrieve documents from the document storage 216 that are linked by the one or more keys. In some embodiments, using the one or more search engines and the indices in the index storage 214, the document retrieval module 204 may retrieve documents 246 from the document storage 216 that are determined to be relevant to the user query 232. The document retrieval module 204 may pass the retrieved documents 246 to the AI module 206. In some embodiments, the AI module 206 also obtains the modified query 244 and the context 242 of the dialogue between the user and the knowledge bot 200.

In some embodiments, the AI module 206 may include a machine learning model (e.g., a large language model such as ChatGPT, Bard, DALL-E, Midjourney, DeepMind, etc.) that is configured to generate a response for the user query 232 based on the modified query 244, the documents 246 and the context 242. The AI module 206 may generate an input (e.g., a prompt) for the machine learning model based on the modified query 244, the documents 246, and the context 242. Based on the prompt, the machine learning model may be configured and trained to generate a response 234 to the query 242 using the content within the documents 246. The response 234 may be in a natural language format that includes sentences and/or paragraphs that is easily interpretable by humans. The user interface module 208 may transmit the response 235 to a device (e.g., the user device 110, the user device 180, the merchant server 120, etc.) that submitted the user query 232 via an interface.

In some embodiments, the AI module 206 may be associated with use multiple machine learning models of different types and/or complexity for generating responses to different user queries. For example, the AI module 206 to use a simpler machine learning model (e.g., a machine learning model having simpler internal structures such a simplified version of ChatGPT, etc.) for generating responses for user queries that are less complex. The responses generated by such a machine learning model may be directly copied from one or more of the relevant documents. On the other hand, the knowledge bot may use a more sophisticated machine learning model (e.g., a machine learning model having more complex internal structures such as a more advanced version of ChatGPT, etc.) for generating responses for user queries that are more complex. The responses generated by such a machine learning model may include new content that is not found in any of the relevant documents. Rather, the new content in some embodiments may be derived or otherwise generated by the machine learning model through the internal structure of the machine learning model based on the relevant documents. After generating the response, the knowledge bot 200 may provide the response on the interface (e.g., display the response on a chat window of a user device, transmit an audio response to a user device, etc.).

The user may continue to interact with the knowledge bot 200 via the interface (e.g., by submitting user queries and viewing responses generated by the knowledge bot 200, etc.). The knowledge bot 200 may continue to store the user queries and the responses in the chat history storage 212 such that updated context of the dialogue between the user and the knowledge bot 200 may be used to enhance the performance of the knowledge bot 200 in generating responses to subsequent queries, using the techniques described herein.

There are many advantages of using large language models to generate automated responses for users. For example, the large language models can interpret and absorb a large amount of raw data, and generate a response using natural languages that summarize and present at least a portion of the knowledge extracted from the raw data (which may include new content that is derived from the raw data). As such, using such large language models to interact with users can provide substantial benefits, as the users can ask any type of question within a certain domain (instead of limited to pre-generated questions presented in a FAQ page) in a free-form style, and responses can be dynamically generated based on knowledge derived from a set of documents. Using the knowledge bot 200, the service provider is no longer required to pre-generate responses to any questions, and may update the documents (internal documents, external documents, etc.) anytime without affecting the operation of the knowledge bot 200.

However, using large language models to generate responses can also be computer resource intensive (and as a result, both power and time consuming), since the large language models are typically implemented in complex computer structures that are used to analyze and process a large amount of data. As such, in order to further enhance the performance of the knowledge bot 200, the chat module 132 of some embodiments may integrate a cache layer 240 within the knowledge bot 200. The cache layer 240 may enable the knowledge bot 240 to store and reuse responses previously generated for other user queries for responding to a current query.

In some embodiments, the cache layer 240 includes a semantic cache system that is configured to store and match previously generated responses with a current user query. The cache layer 240 is different from other conventional cache systems where an exact match of a key (e.g., user query) is required in order to reuse a previously generated response stored as cache data. Using a conventional cache system, a new query has to be identical to a key (which may be a previously submitted query) stored in a cache memory for the cache system to use the response from the matched key for the new query. As such, a query "I want to add card" would not match with a key corresponding to a query "I want to add credit card," and thus, will not trigger a retrieval of the response from the cache memory, even though the response to the query "I want to add card" should be the same as the response to the query "I want to add credit card."

On the other hand, the cache layer 240 includes a semantic cache system that does not store queries directly as keys in the cache memory. Instead, the cache layer 240 is configured to store embeddings generated based on different user queries submitted to the knowledge bot 200 in the past. For example, when the knowledge bot 200 processes a user query (or a modified query), the cache layer 240 (or the document retrieval module 204) may generate embeddings based on the user query. The cache layer 240 may store the embeddings as keys for the cache data, and may store the response generated by the AI module 206 for the user query as value corresponding to the keys.

In some embodiments, due to the limited storage capacity of cache memory, the cache layer 240 may not be able to store embeddings and responses for all previously received queries, and instead may selectively store embeddings and responses corresponding to popular queries (e.g., queries that have been submitted above a frequency threshold, etc.).

When a new user query is received (e.g., the modified query 244), the knowledge bot may determine if a match exists between the modified query 244 and a key in the cache memory, before the modified query 244 is processed by the document retrieval module 204 and/or the AI module 206. The cache layer 240 may generate embeddings for the modified query 244, and determine if any key embedding within the cache memory is within a threshold distance from the embeddings generated for the modified query 244. If a key embedding is within the threshold distance from the embeddings generated for the modified query 244, the cache layer 240 may retrieve a response from the cache memory that corresponds to the matched key embedding, and provide the response to the interface as a response to the query 232, which substantially reduce the computation complexity and processing time for processing the user query 232. Using the semantic cache system, the cache layer 240 would match the query "I want to add card" to the key embeddings generated for a previously submitted query "I want to add credit card" since the embeddings generated for the two queries should be sufficiently similar (e.g., close within a threshold distance) even though the two queries are not identical.

In some embodiments, after generating the knowledge bot 200 and before putting the knowledge bot 200 in use for users, the chat module 132 may validate the responses generated by the knowledge bot 200 to ensure that the quality of the responses generated by the knowledge bot 200 is above a threshold. The threshold may vary depending on the type of query, e.g., a query that needs a more exact or accurate response may have a higher accuracy threshold than a query that only needs a more general response. The chat module 132 may validate the responses in an online manner and an offline manner. As such, the chat module 132 may incorporate an online validation module 252 configured to validate responses generated by the knowledge bot 200 in an online manner, and an offline validation module 254 configured to validate responses generated by the knowledge bot 200 in an offline manner.

In some embodiments, the offline validation module 254 may use a set of test queries for validating the knowledge bot 200 in an offline manner (e.g., in a testing environment separate from a production environment). The set of test queries may include queries of different lengths to ensure that the knowledge bot 200 can provide responses to user queries of different lengths with a quality above a threshold. Thus, the offline validation module 254 may obtain the set of test queries which includes a portion that is below a length threshold and another portion that is above the length threshold. The test queries may have been provided to different chat bots and may have been reviewed and revised by one or more human agents. Based on the work performed by other chat bots and/or human agents, a set of benchmark responses corresponding to the set of test queries may be obtained by the offline validation module 254.

To validate the knowledge bot 200, the offline validation module 254 may provide the set of test queries to the knowledge bot 200 as user queries. Using the techniques disclosed herein, the knowledge bot 200 may generate responses (e.g., a set of test responses) for the set of test queries. Since the responses generated by the knowledge bot 200 is in a natural language format, which can be expressed in multiple different ways (e.g., different tones, using different words having the same meaning, using a variety of different phrases for the same meaning, etc.), it is not effective to compare the responses generated by the knowledge bot 200 with the benchmark responses in a literal manner (e.g., comparing word-for-word between the two responses). Thus, the offline validation module 254 may determine whether the contextual meaning of the responses generated by the knowledge bot 200 matches the contextual meaning of the benchmark responses.

To do so, the offline validation module 254 may generate embeddings based on each of the set of benchmark responses. The offline validation module 254 may also generate embeddings based on each of the set of test responses generated by the knowledge bot 200. Since the embeddings generated for a response represent the semantic meaning of the response, it is effective to compare the embeddings of the responses to determine whether the test responses represent accurately the meaning of the benchmark responses. For each of the set of test queries, the offline validation module 254 may compare the embeddings generated based on the corresponding benchmark response against the embeddings generated based on the corresponding test response. In some embodiments, the offline validation module 254 may determine a deviation between the two embeddings. The deviation between a test response and a corresponding benchmark response may represent how similar (or how different) the two responses are in their semantic meanings. The offline validation module 254 may continue to determine deviations between other pairs of responses.

If the deviations between the set of test responses and the set of benchmark responses (e.g., the chat system may use a total deviation, an average deviation, a mean deviation, etc.) are greater than a threshold, the chat module 132 may reconfigure the knowledge bot 200. For example, the chat module 132 may reconfigure the knowledge bot 200 by adjusting one or more parameters associated with the search engines in the document retrieval module 204 and/or adjusting one or more parameters associated with the machine learning model in the AI module 206. In some embodiments, the chat module 132 may test various versions of the knowledge bot 200 (each version may be associated with different parameters for the search engines in the document retrieval module 204 and/or different parameters for the machine learning model in the AI module 206). The chat module 132 of some embodiments may select the version of the knowledge bot 200 having the least deviations for use in a production environment.

In some embodiments, the online validation module 252 may be configured to validate queries and/or responses for the knowledge bot 200 during a production environment. For example, when a user query is submitted through the interface of the knowledge bot 200, the online validation module 252 may intercept the user query, and may validate the user query before it is passed to other modules within the knowledge bot 200 for processing the user query. The validation of the user queries ensures that the user queries are associated with one of the domains that the knowledge bot 200 is configured to serve, and that there is sufficient certainty (e.g., exceeds a threshold) that the knowledge bot 200 can generate an acceptable answer for the user queries.

As such, when the online validation module 252 intercepts a user query, the online validation module 252 may analyze the user query (e.g., by parsing the words in the user query). The online validation module 252 may determine whether the user query is associated with one of the domains (if so, the user query is deemed to be appropriate) or not associated with one of the domains (if so, the user query is deemed to be inappropriate). The online validation module 252 may pass the user query to the formatting module 202 and/or the document retrieval module 204 only if the user query is deemed to be appropriate. If the user query is deemed to be inappropriate, the online validation module 252 may provide a default response (e.g., "we have no answer to your question," etc.) to the user without passing the user query to other modules of the knowledge bot 200 for processing.

When the AI module 206 generates a response for a user query, the online validation module 252 of some embodiments may also validate the response before the response is provided to a user device through the interface of the knowledge bot 200. In some embodiments, the online validation module 252 may analyze the response (e.g., by parsing the words in the response), and may determine whether the response is in compliance with a set of guidelines associated with the service provider. For example, the service provider may include guidelines that prohibit the use of certain words or require the use of certain words for one or more domains. As such, the online validation module 252 determines if the response is in compliance with the guidelines. If the response is not in compliance with the guidelines, the online validation module 252 may modify the response before providing the modified response to the user. For example, the online validation module 252 may add words to or remove/change words from the response based on the guidelines. In some embodiments, when the response generated by the AI module 206 is deemed to be inappropriate overall, the online validation module 252 may not provide the response to the user, and may instead provide a default response (e.g., "we cannot find an answer to your question," etc.) to the user.

Due to the modular structure of the knowledge bot 200, the knowledge bot 200 is generated to be flexible in terms of the components that are integrated within the knowledge bot 200 and the user base for which it serves. For example, as discussed herein, since the AI module 206 is configured to generate responses solely based on a prompt, which includes the user query and the set of documents from which the response is generated, the knowledge bot 200 can seamlessly provide responses across different domains. In some embodiments, the chat module 132 may provide corpuses of documents and corresponding indices associated with different domains to the knowledge bot 200 (and store them in the document storage 216 and the index storage 214) such that the knowledge bot 200 can service user queries associated with different domains. Alternatively, the chat module 132 may generate multiple knowledge bots, each knowledge bot being similar to the knowledge bot 200, and may provide corpuses of documents and corresponding indices to the different knowledge bots, respectively, such that each of the knowledge bots may be configured to service user queries associated with a corresponding domain. Furthermore, the chat module 132 may replace any of the components (e.g., the query formatting module 202, the document retrieval module 204 (or any of the search engines within the document retrieval module 204), or the AI module 206) without affecting the operations of the knowledge bot 200, which enables updates and/or improvements to be performed on the knowledge bot 200 seamlessly.

Figure 3:
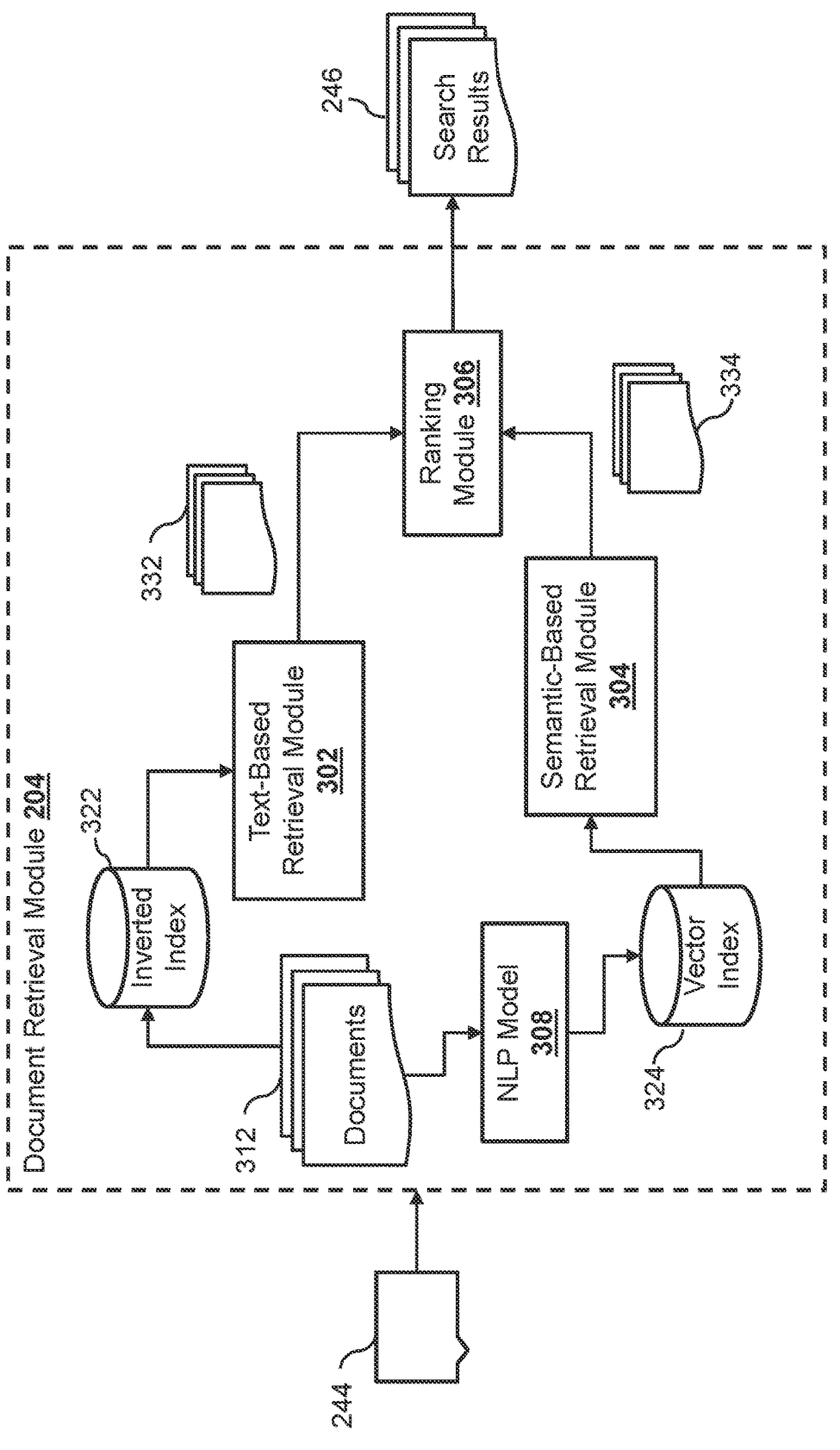
FIG. 3 is a block diagram illustrating a document retrieval module that utilizes multiple search engines for generating search results according to an embodiment of the present disclosure.

FIG. 3 illustrates an example schematic of the document retrieval module 204 according to various embodiments of the disclosure. In this example, the document retrieval module 204 includes two search engines, including a text-based retrieval module 302 and a semantic-based retrieval module 304, that work together to perform the document retrieval functionalities for the knowledge bot 200. In some embodiments, when the chat module 132 generates and configures the knowledge bot 200 to service user queries associated with a particular domain, the chat module 132 may obtain a corpus of documents 312 associated with the particular domain. The chat module 132 may generate an inverted index 322 based on the corpus of documents 312 and may use a natural language processing model 308 to generate a vector index 324 based on the corpus of documents 312. The chat module 132 may store the corpus of documents 312 in the document storage 216, and may store the inverted index 322 and the vector index 324 in the index storage 214.

As the document retrieval module 204 receives a user query (or a modified user query, such as the modified query 244), the document retrieval module 204 may use the text-based retrieval module 302 and the semantic-based retrieval module 304 to retrieve documents, from the corpus of documents 312, that are relevant to the modified query 244. For example, the text-based retrieval module 302 may extract words or character strings from the modified query 244, and may determine if the words or character strings extracted from the modified query 244 match any keys in the inverted index 322. Once the text-based retrieval module 302 has identified keys in the inverted index 322 that match the words or character strings extracted from the modified query 244, the text-based retrieval module 302 may retrieve a set of documents 332 from the corpus of documents 312 based on the identified keys from the inverted index 322.

The semantic-based retrieval module 304 may generate embeddings (e.g., vectors) based on the modified query 244, and may determine if the embeddings generated based on the modified query 244 match any keys in the vector index 324. Once the semantic-based retrieval module 304 has identified keys in the vector index 324 that match the embeddings generated based on the modified query 244, the semantic-based retrieval module 304 may retrieve a set of documents 334 from the corpus of documents 312 based on the identified keys from the vector index 324.

As discussed herein, each of the search engines (e.g., the text-based retrieval module 302 and the semantic-based retrieval module 304) has its strengths and weaknesses, and may retrieve relevant documents that the other search engine may miss. One advantage of using the semantic-based retrieval module 304 (and the vector index 324) to query the corpus of documents 312 is that documents that share similar semantic contexts with the modified query 244 (but may not include identical keywords within the documents) will be retrieved by the semantic-based retrieval module 304. Since the documents do not include identical keywords as the user query, the text-based retrieval module 302 may not be capable of retrieving such relevant documents using the inverted index 322. On the other hand, since the embeddings stored in the vector index 324 are constrained by the number of dimensions, and may not be able to represent every keyword in the documents, the semantic-based retrieval module 304 may miss certain relevant documents that the text-based retrieval module 302 can retrieve based on the modified query 244. As such, the set of documents 332 retrieved by the text-based retrieval module 302 and the set of documents 334 retrieved by the semantic-based retrieval module 304 may not completely overlap, as the text-based retrieval module 302 may retrieve one or more documents that are missed by the semantic-based retrieval module 304, and the semantic-based retrieval module 304 may similarly retrieve one or more documents that are missed by the text-based retrieval module 302.

In order to optimize the search capability of the document retrieval module 204, the document retrieval module 204 may use a ranking module 306 to merge the sets of documents 332 and 334 retrieved by the respective retrieval modules. In some embodiments, as the text-based retrieval module 302 and the semantic-based retrieval module 304 retrieves the respective set of documents 332 and 334, the text-based retrieval module 302 and the semantic-based retrieval module 304 may determine a relevancy score (or confidence score) for each of the retrieved documents. The score may indicate how confident the retrieval module is that the corresponding document is related to the modified query 244. For example, the text-based retrieval module 302 may determine a higher score for a document from the set of documents 332 that includes all of the words extracted from the modified query 244 than a document from the set of documents 332 that includes only one word extracted from the modified query 244. Similarly, the semantic-based retrieval module 304 may determine a higher score for a document from the set of documents 334 that is associated with embeddings closer to the embeddings generated based on the modified query 244 than a document from the set of documents 334 that is associated with embeddings farther away from the embeddings generated based on the modified query 244.

In some embodiments, the ranking module 306 may merge the sets of documents 332 and 334, and may rank the documents from the merged documents based on the scores. The ranking module 306 may then generate a set of relevant documents as the search result 246 for the knowledge bot 200 (e.g., selecting the highest ranked number of documents, etc.).

FIG. 4 illustrates a process 400 for generating and validating a knowledge bot according to various embodiments of the disclosure. In some embodiments, at least a portion of the process 400 may be performed by the chat module 132. The process 400 begins by obtaining (at step 405) a corpus of document associated with a domain. For example, when the chat module 132 receives a request to generate a knowledge bot (e.g., the knowledge bot 200) for servicing queries associated with a particular domain, the chat module 132 may retrieve documents (e.g., the corpus of documents 312) that are associated with the particular domain. For example, when the particular domain is associated with products and/or services offered by a service provider, the chat module 132 may access the service provider server 130, and may search and obtain documents that are related to the products and/or services, such as user manuals associated with the products and/or services, technical articles associated with the products and/or services, marketing materials associated with the products and/or services, third-party reviews of the products and/or services, or other materials related to the products and/or services.

The process 400 then generates (at step 410) one or more search indices for indexing the corpus of document for use by one or more search models and integrates (at step 415) the one or more search models and the one or more search indices with an artificial intelligence (AI) model to generate a knowledge bot. For example, the chat module 132 may generate the inverted index 322 by extracting keywords from each document in the corpus of documents 312. The inverted index 322 may include multiple key-value pairs. Each key-value pair may include an extracted keyword as the key, and a location address of the document from which the keyword was extracted as the value. The inverted index 322 may be used by the text-based retrieval module 302 for retrieving relevant documents from the corpus of documents 312.

The chat module 132 may also use a natural language processing model 308 to generate embeddings from each document in the corpus of documents 312, and may generate the vector index 324 based on the embeddings. The vector index 324 may also include multiple key-value pairs. Each key-value pair may include an embedding as the key, and a location address of the document from which the embedding was generated as the value. The vector index 324 may be used by the semantic-based retrieval module 304 for retrieving relevant documents from the corpus of documents 312.

The chat module 132 may integrate the document retrieval module 204, which includes the text-based retrieval module 302 and the semantic-based retrieval module 304, and the AI module 206 in the knowledge bot 200. In some embodiments, the AI module 206 may include a large language model (e.g., ChatGPT, Bard, etc.) configured to generate a response in a natural language format based on a prompt.

After integrating the various modules into the knowledge bot, the process 400 may validate the knowledge bot, for example, by obtaining (at step 420) sample user queries and target answers for the sample user queries and using (at step 425) the knowledge bot to generate candidate answers for the sample user queries. For example, the chat module 132 may obtain a set of test queries for validating the knowledge bot 200 in an offline manner. The set of test queries may include queries of different lengths to ensure that the knowledge bot 200 can provide responses to user queries of different lengths with a quality above a threshold. The chat module 132 may provide the set of test queries to the knowledge bot 200 as user queries. The knowledge bot may generate responses based on the set of test queries.

The process 400 determines (at step 430) whether the responses generated by the knowledge bot 200 is acceptable (e.g., based on a threshold, system guidelines, compliance requirements, etc., as discussed above). If the responses are acceptable, the process 400 deploys (at step 440) the knowledge bot in a production environment. On the other hand, if the responses are not acceptable, the process 400 adjusts (at step 435) parameters associated with the knowledge bot, and reiterate through the validation steps (e.g., the step 425 and 430). For example, the chat module 132 may compare the responses generated by the knowledge bot 200 against a set of benchmark responses that were prepared for the set of test queries. In some embodiments, instead of comparing the responses directly, the chat module 132 may generate embeddings for each response generated by the knowledge bot 200 and each corresponding benchmark response. The chat module 132 may compare the embeddings associated with the response generated by the knowledge bot 200 and the embeddings associated with the corresponding benchmark response. The chat module 132 may determine a deviation between the two embeddings. In some embodiments, the chat module 132 may determine deviations for all of the responses generated by the knowledge bot 200, and may determine that the responses are acceptable if the deviations (e.g., a sum, an average, a median, etc.) are below a threshold. If the responses are acceptable, the chat module 132 may deploy the knowledge bot 200 in a production environment for use by various users.

On the other hand, if it is determined that the responses are not acceptable (e.g., the deviations exceed the threshold, etc.), the chat module 132 may adjust the parameters associated with the search engines (e.g., the text-based retrieval module 302 and the semantic-based retrieval module 304) and/or the parameters associated with the AI module 206. Adjustments to the parameters associated with the search engines may affect the documents that are retrieved by the respective search engines. Adjustments to the parameters associated with the AI module 206 may affect how responses are generated by the knowledge bot 200 (e.g., how to extract content from the relevant documents, how to summarize the content from the relevant documents, the word choice/language used in the response, the tone used in the response, etc.). The chat module 132 may continue to adjust the parameters of the knowledge bot 200 and test the responses generated by the knowledge bot 200 until the responses generated by the knowledge bot 200 are acceptable. In some embodiments, the chat module 132 may generate multiple versions of the knowledge bot 200 based on different sets of parameters, and may select the version that has the highest response quality (e.g., lowest deviations from the benchmark responses, etc.).

FIG. 5 illustrates a process 500 for using a knowledge bot to generate a response for a user query according to various embodiments of the disclosure. In some embodiments, at least a portion of the process 500 may be performed by the chat module 132 and/or the knowledge bot 200. The process 500 begins by receiving (at step 505) a user query from a user device. For example, the knowledge bot 200, through the UI module 208 and an interface presented on a device (e.g., the user device 110, the user device 180, the merchant server 120, etc.), may receive a user query (e.g., the user query 232) submitted by a user.

In step 510, the process 500 modifies the user query based on a context of a dialogue. For example, the knowledge bot 200 may store previous dialogues between the user and the knowledge bot 200 (e.g., user queries submitted by the user and responses generated by the knowledge bot 200 for responding to the user queries) in the chat history data storage 212. Since the context of the previous dialogue may be useful for assisting the knowledge bot 200 to interpret the user query 232 correctly, the query formatting module 202 may modify the user query 232 to generate the modified query 244 based on the context. The modification may include adding words to the user query 232, removing words from the user query 232, or replacing words with other words in the user query 232.

The process 500 then determines (at step 515) whether a response stored in cache memory can be used to respond to the user query. If it is determined that a response from the cache memory can be used to respond to the user query, the process 500 retrieves (at step 520) the response from the cache memory and provides the response to the user device. For example, the knowledge 200 may analyze the modified query 244 to determine whether the modified query 244 corresponds to any of the keys in the cache memory. In some embodiments, the cache layer 240 may generate embeddings based on the modified query 244, and may determine whether the embeddings correspond to any keys in the cache memory. Each key in the cache layer 240 may include one or more embeddings generated based on previously submitted user queries. As such, the cache layer 240 may determine whether the embeddings generated based on the modified query 244 are within a threshold distance from the embeddings corresponding to the keys in the cache memory. If a match exists between the embeddings generated based on the modified query 244 and a key, the cache layer 240 may retrieve the response corresponding to the key, and may provide the response to the user device as a response to the query 232.

On the other hand, if it is determined that no response stored in the cache memory can be used to respond to the user query, the process 500 retrieves (at step 525), from the corpus of documents, a set of documents relevant to the modified user query using one or more search models. For example, the document retrieval module 204 may use one or more search engines to retrieve relevant documents based on the modified query 244. In some embodiments, the document retrieval module 204 may use the text-based retrieval module 302 and the semantic-based retrieval module 304 to retrieve relevant documents based on the modified query 244. The text-based retrieval module 302 may use the inverted index 322 to identify, from the corpus of documents 312, a set of documents 332 that is relevant to the modified query 244. The semantic-based retrieval module 304 may use the vector index 324 to identify, from the corpus of documents 312, a set of documents 334 that is relevant to the modified query 244. The ranking module 306 may select a subset of documents from the set of documents 332 and the set of documents 334 as the search results 246.

The process 500 then generates (at step 530) a prompt for the AI model based on the modified user query and the set of documents and obtains (at step 535) a response from the AI model. For example, upon receiving the search results 246, which includes a set of documents that are determined to be relevant to the modified query 244, the knowledge bot 200 may generate an input (e.g., a prompt) for the AI module 206 using the modified query 244, the search results 246, and the context 242. The AI module 206 may generate a response 234 based on the prompt.

After obtaining a response (either from the AI model or obtained from the cache memory), the process 500 validates (at step 540) the response and provides (at step 545) the response to the user device. For example, the online validation module 262 may validate the response 234. If the response 234 is in compliance with a set of guidelines associated with a service provider, the knowledge bot 200 may provide the response 234 to the user device that submitted the user query 232. On the other hand, if the response 234 is not in compliance with the set of guidelines, the online validation module 252 may modify the response 234 or replace the response 234 with a default response before providing the modified response to the user device.

FIG. 6 illustrates a process 600 for retrieving documents that are relevant to a user query according to various embodiments of the disclosure. In some embodiments, at least a portion of the process 600 may be performed by the chat module 132 and/or the knowledge bot 200. The process 600 begins by receiving (at step 605) a user query. For example, the knowledge bot 200, through the UI module 208 and an interface presented on a device (e.g., the user device 110, the user device 180, the merchant server 120, etc.), may receive a user query (e.g., the user query 232) submitted by a user.

The process 600 then uses (at step 610) a text-based retrieval module and an inverted index to retrieve a first set of documents from the corpus of documents based on the user query, and uses (at step 615) a semantic-based retrieval module and a vector index to retrieve a second set of documents from the corpus of documents based on the user query. For example, the document retrieval module 204 may include the text-based retrieval module 302 that is configured to use the inverted index 322 to identify a set of documents 332 that is relevant to the modified query 244. The document retrieval module 204 may also include the semantic-based retrieval module 302 that is configured to use the vector index 324 to identify a set of documents 334 that is relevant to the modified query 244.

The process 600 collectively ranks (at step 620) the first set of documents and the second set of documents and determines (at step 625) a subset of documents from the first and second sets of documents based on the ranking. For example, the text-based retrieval module 302 may determine a score for each document in the set of documents 332 that is determined to be relevant to the modified query 244. The score may indicate a degree of relatedness between the corresponding document and the modified query 244 such that a first document may have a higher score than a second document if it is determined that the first document is more closely related to the modified query 244 than second document. Similarly, the semantic-based retrieval module 304 may determine a score for each document in the set of documents 334 that is determined to be relevant to the modified query 244. The document retrieval module 204 may then merge the set of documents 332 with the set of documents 334, and rank the documents in the merged set based on the scores. In some embodiments, the document retrieval module 204 may select a subset of the documents (e.g., the top 10 ranked documents, etc.) as the search results 246 for the modified query 244.

The process 600 determines (at step 630) if the quality of the subset of documents is above a threshold. If it is determined that the quality of the subset of documents is not above the threshold, the process 600 provides (at step 635) a default response. On the other hand, if it is determined that the quality of the subset of documents is above the threshold, the process 600 provides (at step 640) the subset of documents to the AI model. For example, the document retrieval module may determine whether the quality of the search results 246 is above a threshold (e.g., whether the collective score, such as an average, a median, etc., of the search results 246 is above a threshold score, etc.). If it is determined that the quality is not above the threshold, the document retrieval module 204 may determine that the knowledge bot 200 does not have sufficient knowledge to respond to the user query 232. They knowledge bot 200 may then abort the process of generating a response to the user query 232 by the AI module 206, and instead provide a default response (e.g., "we are not able to answer your question," etc.) to the user device.

On the other hand, if it is determined that the quality of the search results 246 is above the threshold, the document retrieval module 204 may provide the search results 246 to the AI module 206 such that the AI module may generate a response to the user query 232 based on the content extracted from the search results 246.

Figure 7:
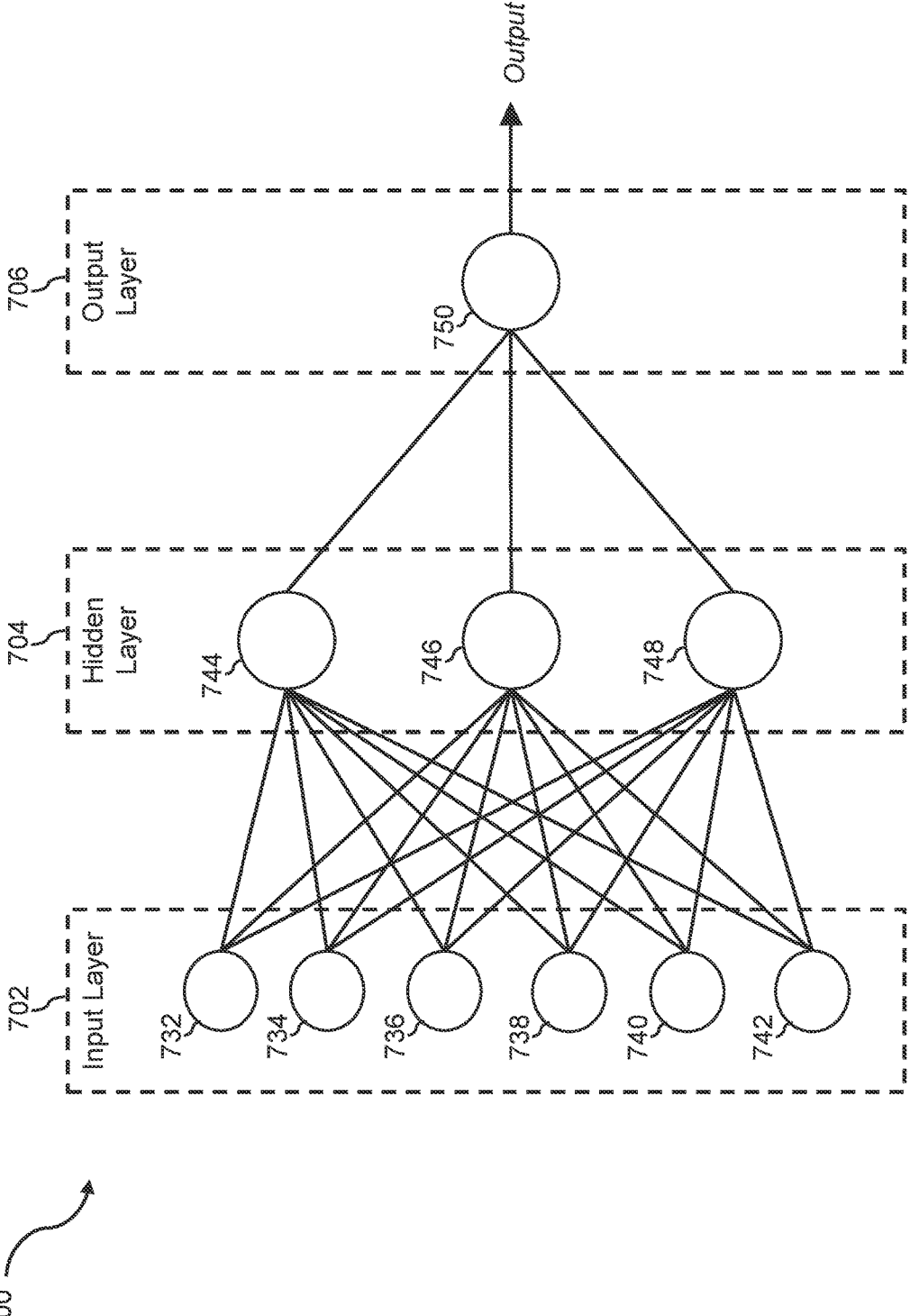
FIG. 7 illustrates an example neural network that can be used to implement a machine learning model according to an embodiment of the present disclosure.

FIG. 7 illustrates an example artificial neural network 700 that may be used to implement a machine learning model, such as the large language model associated with the AI module 206, the natural language model 308, and the semantic-based retrieval module 304. As shown, the artificial neural network 700 includes three layers—an input layer 702, a hidden layer 704, and an output layer 706. Each of the layers 702, 704, and 706 may include one or more nodes (also referred to as "neurons"). For example, the input layer 702 includes nodes 732, 734, 736, 738, 740, and 742, the hidden layer 704 includes nodes 744, 746, and 748, and the output layer 706 includes a node 750. In this example, each node in a layer is connected to every node in an adjacent layer via edges and an adjustable weight is often associated with each edge. For example, the node 732 in the input layer 702 is connected to all of the nodes 744, 746, and 748 in the hidden layer 704. Similarly, the node 744 in the hidden layer is connected to all of the nodes 732, 734, 736, 738, 740, and 742 in the input layer 702 and the node 750 in the output layer 706. While each node in each layer in this example is fully connected to the nodes in the adjacent layer(s) for illustrative purpose only, it has been contemplated that the nodes in different layers can be connected according to any other neural network topologies as needed for the purpose of performing a corresponding task.

The hidden layer 704 is an intermediate layer between the input layer 702 and the output layer 706 of the artificial neural network 700. Although only one hidden layer is shown for the artificial neural network 700 for illustrative purpose only, it has been contemplated that the artificial neural network 700 used to implement any one of the computer-based models may include as many hidden layers as necessary. The hidden layer 704 is configured to extract and transform the input data received from the input layer 702 through a series of weighted computations and activation functions.

In this example, the artificial neural network 700 receives a set of inputs and produces an output. Each node in the input layer 702 may correspond to a distinct input. For example, when the artificial neural network 700 is used to implement the machine learning model associated with the AI module 206, the nodes in the input layer 702 may correspond to different parameters and/or attributes of a prompt (which may be generated based on the modified query 244, the context 242, and the search results 246).

In some embodiments, each of the nodes 744, 746, and 748 in the hidden layer 704 generates a representation, which may include a mathematical computation (or algorithm) that produces a value based on the input values received from the nodes 732, 734, 736, 738, 740, and 742. The mathematical computation may include assigning different weights (e.g., node weights, edge weights, etc.) to each of the data values received from the nodes 732, 734, 736, 738, 740, and 742, performing a weighted sum of the inputs according to the weights assigned to each connection (e.g., each edge), and then applying an activation function associated with the respective node (or neuron) to the result. The nodes 744, 746, and 748 may include different algorithms (e.g., different activation functions) and/or different weights assigned to the data variables from the nodes 732, 734, 736, 738, 740, and 742 such that each of the nodes 744, 746, and 748 may produce a different value based on the same input values received from the nodes 732, 734, 736, 738, 740, and 742. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 702 is transformed into rather different values indicative data characteristics corresponding to a task that the artificial neural network 700 has been designed to perform.

In some embodiments, the weights that are initially assigned to the input values for each of the nodes 744, 746, and 748 may be randomly generated (e.g., using a computer randomizer). The values generated by the nodes 744, 746, and 748 may be used by the node 750 in the output layer 706 to produce an output value (e.g., a response to a user query, a prediction, etc.) for the artificial neural network 700. The number of nodes in the output layer depends on the nature of the task being addressed. For example, in a binary classification problem, the output layer may consist of a single node representing the probability of belonging to one class (as in the example shown in FIG. 7). In a multi-class classification problem, the output layer may have multiple nodes, each representing the probability of belonging to a specific class. When the artificial neural network 700 is used to implement the machine learning model associated with the AI module 206, the output node 750 may be configured to generate new content (e.g., a response in a natural language format) based on the prompt.

In some embodiments, the artificial neural network 700 may be implemented on one or more hardware processors, such as CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware used to implement the neural network structure is specifically configured based on factors such as the complexity of the neural network, the scale of the tasks (e.g., training time, input data scale, size of training dataset, etc.), and the desired performance.

The artificial neural network 700 may be trained by using training data based on one or more loss functions and one or more hyperparameters. By using the training data to iteratively train the artificial neural network 700 through a feedback mechanism (e.g., comparing an output from the artificial neural network 700 against an expected output, which is also known as the "ground-truth" or "label"), the parameters (e.g., the weights, bias parameters, coefficients in the activation functions, etc.) of the artificial neural network 700 may be adjusted to achieve an objective according to the one or more loss functions and based on the one or more hyperparameters such that an optimal output is produced in the output layer 706 to minimize the loss in the loss functions. Given the loss, the negative gradient of the loss function is computed with respect to each weight of each layer individually. Such negative gradient is computed one layer at a time, iteratively backward from the last layer (e.g., the output layer 706 to the input layer 702 of the artificial neural network 700). These gradients quantify the sensitivity of the network's output to changes in the parameters. The chain rule of calculus is applied to efficiently calculate these gradients by propagating the gradients backward from the output layer 706 to the input layer 702.

Parameters of the artificial neural network 700 are updated backwardly from the last layer to the input layer (backpropagating) based on the computed negative gradient using an optimization algorithm to minimize the loss. The backpropagation from the last layer (e.g., the output layer 706) to the input layer 702 may be conducted for a number of training samples in a number of iterative training epochs. In this way, parameters of the artificial neural network 700 may be gradually updated in a direction to result in a lesser or minimized loss, indicating the artificial neural network 700 has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as to predict a frequency of future related transactions.

Figure 8:
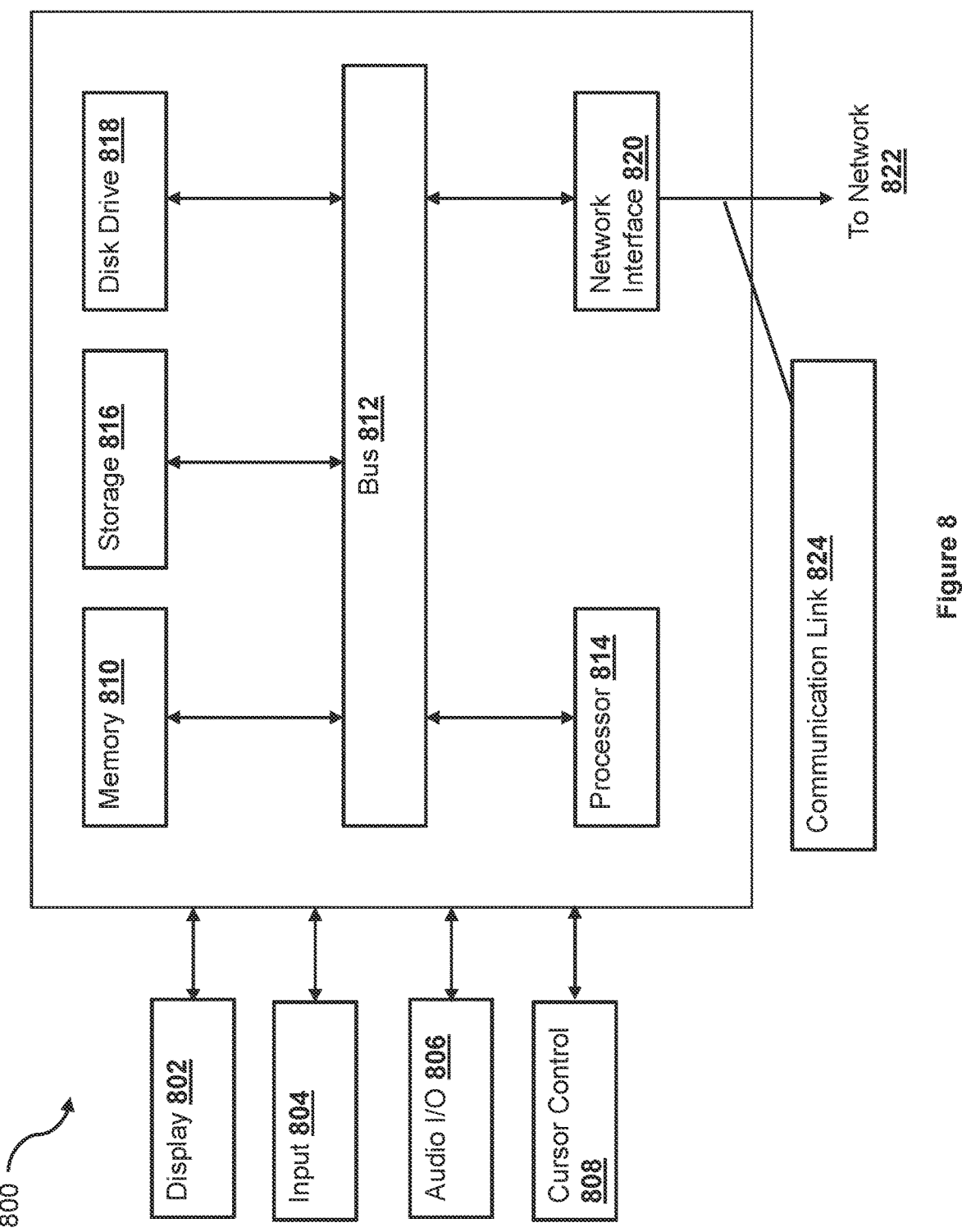
FIG. 8 is a block diagram of a system for implementing a device according to an embodiment of the present disclosure.

FIG. 8 is a block diagram of a computer system 800 suitable for implementing one or more embodiments of the present disclosure, including the service provider server 130, the merchant server 120, the user device 180, and the user device 110. In various implementations, each of the user devices 110 and 180 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, 130, and 180 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as a display 802 and a cursor control 808 (such as a keyboard, keypad, mouse, etc.). The display 802 may be configured to present a login page for logging into a user account or a checkout page for purchasing an item from a merchant. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a service provider server via a network 822. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818 (e.g., a solid-state drive, a hard drive). The computer system 800 performs specific operations by the processor 814 and other components by executing one or more sequences of instructions contained in the system memory component 810. For example, the processor 814 can perform the automated response functionalities described herein, for example, according to the processes 400, 500, and 600.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:
1. A system, comprising:
a non-transitory memory; and
one or more hardware processors coupled with the non-transitory memory and configured to read instructions from the non-transitory memory to cause the system to perform operations comprising:

receiving, from a user device, a user query;

generating first embeddings based on parsing a plurality of words of the user query, wherein the first embeddings represent a contextual meaning of the user query;

determining whether a response to the user query is stored in a cache storage based on comparing the first embeddings against a plurality of cache keys associated with the cache storage;

in response to determining that the response to the user query is not stored in the cache storage, querying a corpus of documents using a text-based search model based on one or more keywords extracted from the user query, wherein a first set of documents from the corpus of documents is obtained based on the querying the corpus of documents using the text-based search model;

querying the corpus of documents using a semantic search model based on the first embeddings, wherein a second set of documents from the corpus of documents is obtained based on the querying the corpus of documents using the semantic search model;

selecting, from the first set of documents and the second set of documents, one or more documents having relevancy scores associated with the user query above a threshold;

generating a prompt for a generative artificial intelligence (AI) model based on combining the user query and the one or more documents;

generating, using the generative AI model and based on the prompt, a response to the user query, wherein the response is generated further based on information from the one or more documents;

providing the response to the user device;

obtaining benchmark embeddings representing a benchmark response associated with the user query;

generating second embeddings representing the response generated using the generative AI model; and modifying the corpus of documents based on a difference between the second embeddings and the benchmark embeddings.

2. The system of claim 1, wherein the user query is in a natural language format.

3. The system of claim 1, wherein the text-based search model is configured to identify, from the corpus of documents, the first set of documents based on the one or more keywords extracted from the user query.

4. The system of claim 1, wherein the semantic-based search model is configured to identify, from the corpus of documents, the second set of documents based on the contextual meaning of the user query.

5. The system of claim 1, wherein the first embeddings are generated further based on parsing the plurality of words forward and backward.

6. The system of claim 1, wherein the operations further comprise:

analyzing the first set of documents and the second set of documents; and ranking the first set of documents and the second set of documents based on the analyzing, wherein the one or more documents are selected based on the ranking.

7. The system of claim 1, wherein the modifying the corpus of documents comprises at least one of adding an additional document to the corpus of documents or removing a document from the corpus of documents.

8. A method, comprising:

receiving, by a computer system and from a user device, a user query;

generating, by the computer system, first embeddings representing the user query;

accessing, from a plurality of corpuses of documents, a corpus of documents based on a particular domain associated with the user query;

querying, by the computer system, the corpus of documents using a text-based search model based on one or more keywords extracted from the user query, wherein a first set of documents is obtained based on the querying the corpus of documents using the text-based search model;

querying, by the computer system, the corpus of documents using a semantic search model based on the first embeddings, wherein a second set of documents is obtained based on the querying the corpus of documents using the semantic search model;

determining, by the computer system and from the first set of documents and the second set of documents, that two or more documents are associated with a response to the user query;

generating, using a machine learning model and based on an input comprising the user query and the two or more documents, the response to the user query, wherein the response comprises content generated based on information extracted from at least two documents in the two or more documents;

generating second embeddings representing the response generated using the machine learning model;

accessing benchmark embeddings representing a benchmark response associated with the user query; and modifying the corpus of documents based on comparing the second embeddings against the benchmark embeddings.

9. The method of claim 8, wherein the user query is a first user query that is part of a dialogue between a user of the user device and a knowledge bot, and wherein the method further comprises:

retrieving a chat history associated with the user of the user device, wherein the chat history comprises one or more user queries previously submitted by the user and one or more responses generated by the machine learning model for the one or more user queries;

deriving a context based on the chat history; and modifying the first user query based on the context, wherein the two or more documents are determined to be associated with the first user query based on the modified first user query.

10. The method of claim 9, wherein the modifying the first user query comprises at least one of adding one or more words to, deleting one or more words from, or revising one or more words from the first user query based on at least one of the one or more user queries or the one or more responses.

11. The method of claim 9, wherein the input further comprises the context and the modified first user query.

12. The method of claim 8, further comprising:

determining, from a plurality of domains, that the user query is associated with the particular domain based on analyzing the user query.

13. The method of claim 8, further comprising:

determining a score for each document in the first set of documents and the second set of documents;

ranking the first set of documents and second set of documents based on the score determined for each document in the first set of documents and the second set of documents; and selecting, from the first set of documents and the second set of documents, the two or more documents based on the ranking.

14. The method of claim 8, wherein the response comprises words in a natural language format.

15. A non-transitory machine-readable medium having stored thereon machine-readable instructions executable to cause a machine to perform operations comprising:

generating, based on a query, first embeddings that represent a semantic meaning of the query;

querying a corpus of documents using a text-based search model based on one or more keywords extracted from the query, wherein a first set of documents is obtained based on the querying the corpus of documents using the text-based search model;

querying the corpus of documents using a semantic search model based on the first embeddings, wherein a second set of documents is obtained based on the querying the corpus of documents using the semantic search model;

determining, from the first set of documents and the second set of documents, that two or more documents are associated with a response to the query;

generating, using a machine learning model and based on a prompt that includes the query and the two or more documents, the response to the query, wherein the response comprises content generated based on information extracted from at least two documents in the two or more documents;

obtaining benchmark embeddings representing a benchmark response associated with the query;

generating second embeddings representing the response generated using the machine learning model; and modifying the corpus of documents based on a difference between the second embeddings and the benchmark embeddings.

16. The non-transitory machine-readable medium of claim 15, wherein the operations further comprise:

comparing the first embeddings against a plurality of cache keys of a cache storage; and determining that the query is not related to an entry in the cache storage based on the comparing.

17. The non-transitory machine-readable medium of claim 15, wherein the semantic-based search model is configured to (i) derive a contextual meaning of the query and (ii) identify, from the corpus documents, the second set of documents based on the contextual meaning of the query.

18. The non-transitory machine-readable medium of claim 15, wherein the first embeddings are generated based on parsing a plurality of words of the query forward and backward.

19. The non-transitory machine-readable medium of claim 15, wherein the query is a first query that is part of a dialogue between a user of a user device and a knowledge bot during a session between the user and a service provider, and wherein the operations further comprise:

retrieving a chat history associated with the user of the user device, wherein the chat history comprises one or more queries previously submitted by the user and one or more responses generated by the machine learning model for the one or more queries;

deriving a context based on the chat history; and modifying the first query based on the context, wherein the two or more documents are determined to be associated with the response to the first query based on the modified first query.

20. The non-transitory machine-readable medium of claim 19, wherein the modifying the first query comprises at least one of adding one or more words to, deleting one or more words from, or revising one or more words from the first query based on at least one of the one or more queries or the one or more responses.

* * * * *